(12) United States Patent
Bush

(10) Patent No.: US 6,236,942 B1
(45) Date of Patent: May 22, 2001

(54) SYSTEM AND METHOD FOR DELINEATING SPATIALLY DEPENDENT OBJECTS, SUCH AS HYDROCARBON ACCUMULATIONS FROM SEISMIC DATA

(75) Inventor: Ronald R. Bush, Austin, TX (US)

(73) Assignee: Scientific Prediction Incorporated, Austin, TX (US)

( * ) Notice: Subject to any disclaimer, the term of this patent is extended or adjusted under 35 U.S.C. 154(b) by 0 days.

(21) Appl. No.: 09/385,345

(22) Filed: Aug. 30, 1999

Related U.S. Application Data

(60) Provisional application No. 60/100,370, filed on Sep. 15, 1998.

(51) Int. Cl.[7] ............................................. G01V 1/28
(52) U.S. Cl. .............................. 702/14; 702/13; 706/929
(58) Field of Search ................................ 702/11, 12, 13, 702/14; 703/10, 5; 706/928, 929

(56) References Cited

U.S. PATENT DOCUMENTS

| | | |
|---|---|---|
| 3,788,398 | 1/1974 | Shephard . |
| 3,921,126 | 11/1975 | Waters . |
| 4,183,405 | 1/1980 | Magnie . |
| 4,279,307 | 7/1981 | Jones . |
| 4,327,805 | 5/1982 | Poston . |
| 5,018,112 | 5/1991 | Pinkerton et al. . |
| 5,103,488 | 4/1992 | Gemello et al. . |
| 5,111,516 | 5/1992 | Nakano et al. . |
| 5,214,744 | 5/1993 | Schweizer et al. . |
| 5,251,286 | 10/1993 | Wiener et al. . |
| 5,265,192 | 11/1993 | McCormack . |
| 5,313,558 | 5/1994 | Adams . |
| 5,351,309 | 9/1994 | Lee et al. . |

(List continued on next page.)

FOREIGN PATENT DOCUMENTS

| | | |
|---|---|---|
| 0731363 | 9/1996 | (EP) . |
| 0840141 | 5/1998 | (EP) . |
| 2303475 | 2/1997 | (GB) . |
| WO 9319426 | 9/1993 | (WO) . |

OTHER PUBLICATIONS

Essenreiter, R, et al., "Multiple Reflection Attenuation in Seismic Data Using Backpropagation", IEEE Transactions on Signal Processing, Jul. 1998, vol. 46, Iss. 7, p. 2001–2011.*

Xing–Yao, Yin, et al., "Predicting Oil and Gas Reservoir and Calculating Thickness of Reservoir from Seismic Data Using Neural Network", 3rd international Conference on Signal Processing, Oct. 1996, vol. 2, Oct., 1966, pp. 14–18.*

Flagship Geo, "Home Page", Publication Date Unknown, http://www.flagshipgeo.com.

* cited by examiner

Primary Examiner—Donald E. McElheny, Jr.
(74) Attorney, Agent, or Firm—Davis & Johnson, LLP

(57) ABSTRACT

A neural network based system, method, and process for the automated delineation of spatially dependent objects is disclosed. The method is applicable to objects such as hydrocarbon accumulations, aeromagnetic profiles, astronomical clusters, weather clusters, objects from radar, sonar, seismic and infrared returns, etc. One of the novelties in the present invention is that the method can be utilized whether or not known data is available to provide traditional training sets. The output consists of a classification of the input data into clearly delineated accumulations, clusters, objects, etc. that have various types and properties. A preferred but non-exclusive application of the present invention is the automated delineation of hydrocarbon accumulations and sub-regions within the accumulations with various properties, in an oil and gas field, prior to the commencement of drilling operations.

31 Claims, 15 Drawing Sheets

HYPOTHETICAL SEISMIC LAYOUT 1200

U.S. PATENT DOCUMENTS

| | | |
|---|---|---|
| 5,355,313 | 10/1994 | Moll et al. . |
| 5,434,927 | 7/1995 | Brady et al. . |
| 5,444,619 | 8/1995 | Hoskins et al. . |
| 5,459,587 | 10/1995 | Fukushima . |
| 5,496,093 | 3/1996 | Barlow . |
| 5,613,039 | 3/1997 | Wang et al. . |
| 5,648,938 | 7/1997 | Jakubowicz . |
| 5,732,697 | 3/1998 | Zhang et al. . |
| 5,740,274 | 4/1998 | Ono et al. . |
| 5,742,740 | 4/1998 | McCormack et al. . |
| 5,754,709 | 5/1998 | Moriya et al. . |
| 5,761,326 | 6/1998 | Brady et al. . |
| 5,775,806 | 7/1998 | Allred . |
| 5,776,063 | 7/1998 | Dittrich et al. . |
| 5,777,481 | 7/1998 | Vivekanandan . |
| 5,812,068 | 9/1998 | Wisler et al. . |
| 5,862,513 | 1/1999 | Mezzatesta et al. . |
| 5,884,295 | 3/1999 | Moll et al. . |
| 5,924,048 | 7/1999 | McCormack et al. . |
| 6,119,112 | 9/2000 | Bush . |

HYPOTHETICAL SEISMIC LAYOUT 1200

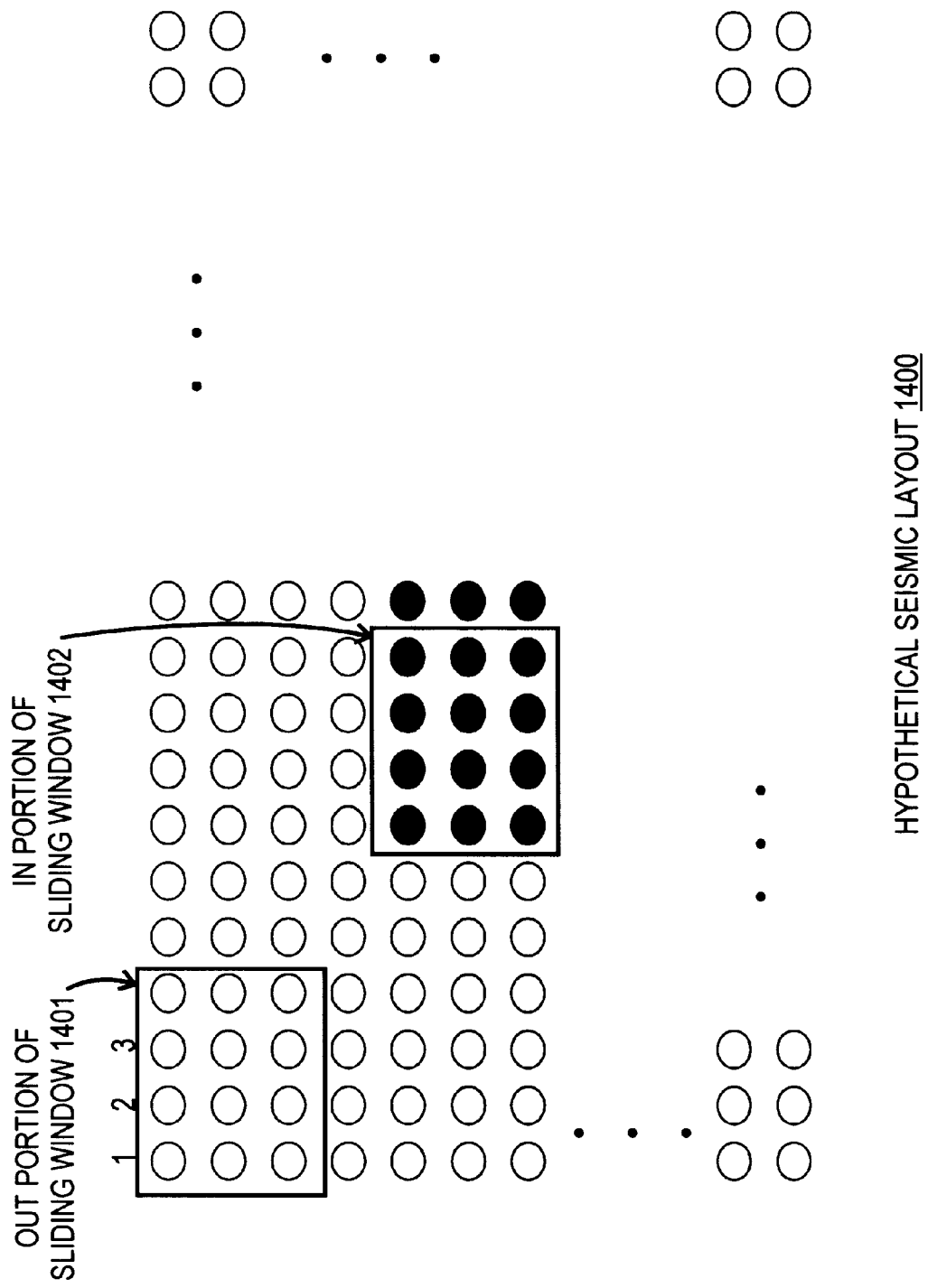

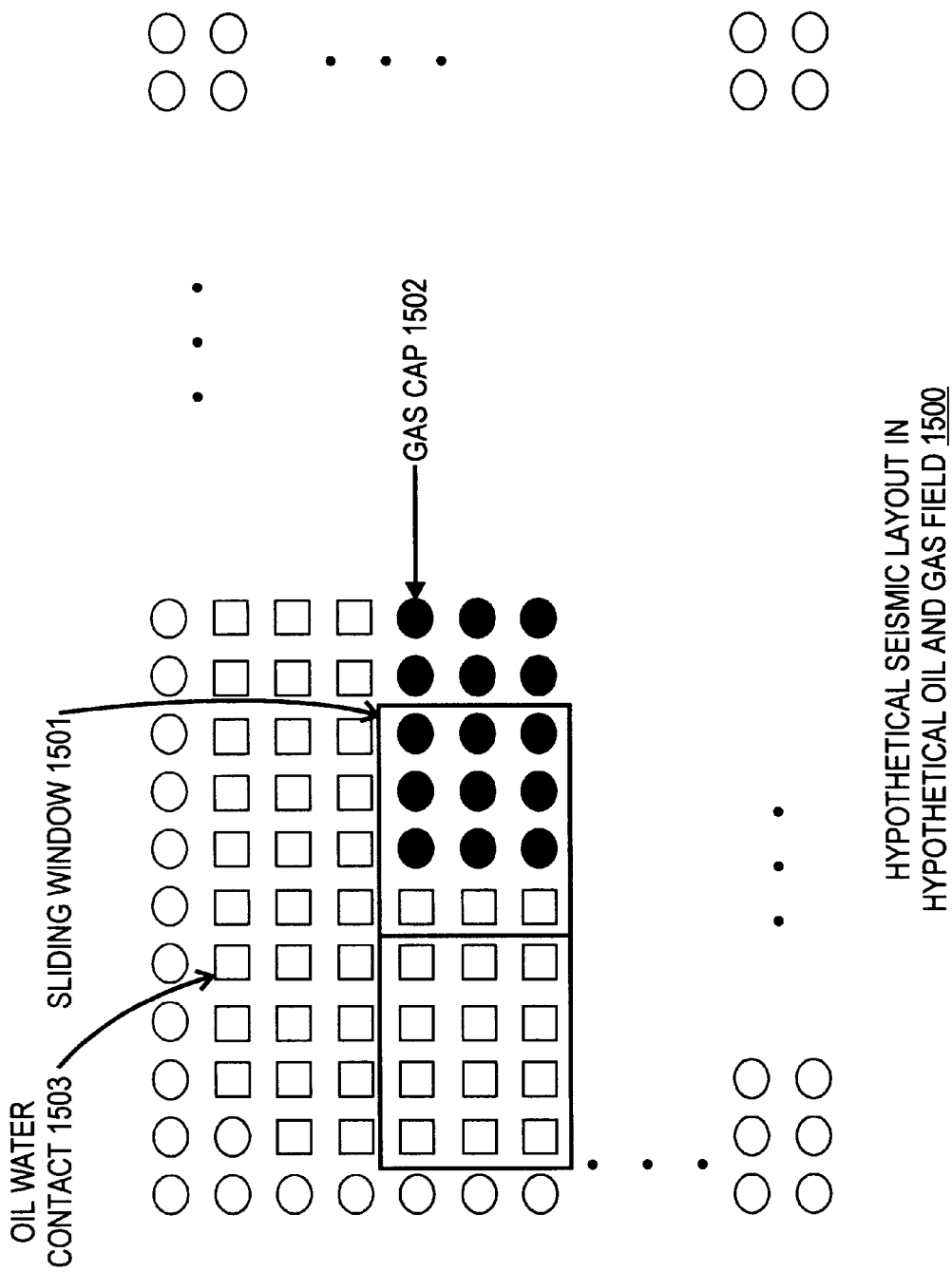

SYSTEM AND METHOD FOR DELINEATING SPATIALLY DEPENDENT OBJECTS, SUCH AS HYDROCARBON ACCUMULATIONS FROM SEISMIC DATA

CROSS REFERENCE TO RELATED APPLICATION

This application claims priority under 35 U.S.C. § 120 of commonly owned U.S. provisional application Ser. No. 60/100,370 filed Sep. 15, 1998, entitled NEURAL NETWORK AND METHOD FOR DELINEATING SPATIALLY DEPENDENT OBJECTS, SUCH AS HYDROCARBON ACCUMULATIONS FROM SEISMIC DATA.

FIELD OF THE INVENTION

This invention relates to a system and method for delineating hydrocarbon accumulations. In particular, this invention is drawn to a method and system using a neural network for delineating spatially dependent objects such as hydrocarbon accumulations from seismic data.

BACKGROUND OF THE INVENTION

1. Field of the Invention

The present invention relates to a system, method, and process for delineating objects in one (1), two (2), or three (3) dimensional space from data that contains patterns related to the existence of said objects. For example, seismic data frequently contains patterns from which hydrocarbon accumulations can be detected through the identification of bright spots, flat spots, and dim spots. In the past, when neural networks have been used for similar purposes other than the detection of hydrocarbon accumulations, it has been necessary to define training sets consisting of data from areas where it is known that certain conditions exist and do not exist. In the case of hydrocarbon accumulations and prior to the disclosures of the present invention, this would have required expensive drilling of oil and gas wells before the data for the training sets could have been acquired. In the method disclosed in the present invention, it is not necessary to use explicitly known training sets to outline the various spatially dependent objects such as hydrocarbon accumulations. By the method disclosed in the present invention, it is possible to automate the interpretation process and quickly provide important information on hydrocarbon accumulations even before drilling commences.

Automated delineation of hydrocarbon accumulations from seismic data will be used as a non-exclusive, actual example to describe the system, method, and process of the present invention. However, the method disclosed is also applicable to a wide range of applications other than hydrocarbon accumulations, such as but not limited to, aeromagnetic profiles, astronomical clusters from radio-telescope data, weather clusters from radiometers, objects from radar, sonar, and infrared returns, etc. Many other applications will be obvious to those skilled in the pertinent art. Accordingly, it is intended by the appended claims to cover all such applications as fall within the true spirit and scope of the present invention.

2. Description of the Prior Art

Many organizations, whether commercial or governmental, have a need to recognize objects from patterns in the data acquired from some sensing process. Spatial delineation of objects is often the first step toward the identification of these objects. Neural networks have been used for this type of delineation and identification in the past. However, prior to the present invention, the neural network approach has generally required that known data be used to form training sets that are used as input to the neural network process. However, acquisition of the known data is often a long and expensive process.

For example, in the oil and gas industry, it is common that seismic data be initially subjected to an interpretation process that is labor intensive. Furthermore, this interpretation is carried out by highly skilled and; therefore, expensive personnel who are limited in the amount of data that they can physically process in a fixed period of time. Even though the interpreters are generally highly skilled and experienced, they are still only able to render subjective judgements as to where hydrocarbon accumulations might exist. Having a clear and accurate areal or spatial delineation of possible hydrocarbon accumulations, i.e. reservoirs, before the interpretation process begins, will greatly improve the accuracy and quality of the interpretation; thereby, reducing the risk in drilling. Drilling of oil and gas wells commonly runs into millions of dollars for each well; and wellbore data, i.e. known data, is not available until this drilling has taken place.

U.S. Pat. No. 5,884,295, which discloses a "System For Neural Network Interpretation of Aeromagnetic Data", is assigned to Texaco, Inc., one of the world's major oil companies. This patent discloses "a system for processing Aeromagnetic survey data to determine depth to basement rock;" and although it does not pertain to the method of the present invention, it is interesting in that it points out "the high cost of drilling deep exploratory well holes and collecting reflection seismic data."

U.S. Pat. No. 5,444,619 (incorporated herein by reference) is assigned to Schlumberger Technology, a leading seismic processing organization. In this patent, the inventors state that "Seismic data are routinely and effectively used to estimate the structure of reservoir bodies but often play no role in the essential task of estimating the spatial distribution of reservoir properties. Reservoir property mapping is usually based solely on wellbore data, even when high resolution 3D seismic data are available." The Schulumberger patent provides a means for extrapolation of wellbore data throughout a field based on seismic data; however, it does not provide a means for the spatial delineation of reservoir properties, such as the gas cap, permeability zones, porosity zones, etc., prior to the acquisition of wellbore data.

The method of the present invention provides a process of spatially delineating accumulations of various types and properties. For example, it provides an automated process for delineating hydrocarbon accumulations from seismic data. One particular hydrocarbon accumulation is the gas below the cap, i.e. gas cap, in an oil and/or gas field. Being able to accurately delineate the gas cap, from 2D and 3D seismic data, before the interpretation process even begins, will prove to be very valuable to the oil and gas industry. See, for example, U.S. Pat. Nos. 4,279,307, 3,788,398, 4,183,405, and 4,327,805 which all rely on knowledge of the gas cap in their various methods and processes for enhancing hydrocarbon recovery. Accurate delineation of the gas cap, from seismic data, is a long felt and important need in the oil and gas industry.

Numerous U.S. patents have been issued on the topics of machine vision, image contour recognition, visual recognition, pattern recognition, image edge sensing, object recognition, object tracking, image edge extraction, etc. See, for example, U.S. Pat. Nos. 5,103,488, 5,111,516, 5,313, 558, 5,351,309, 5,434,927, 5,459,587, 5,613,039, 5,740,274, 5,754,709, and 5,761,326 that deal with subjects tangentially related to the present invention. Even though the cited patents may in some cases provide superior methods, to that of the present invention, for dealing with each of their particular subjects; these patents indicate the potentially wide range of usage for the novelty included in the present invention and indicate the importance of the disclosure of the present invention. Furthermore, those skilled in the pertinent arts will find a wide range of application for the present invention. It is, therefore, intended by the appended claims to cover all such applications that fall within the true spirit and scope of the present invention. In addition to the patents cited above, a number of specific examples where the present invention might find usage have also been addressed in U.S. patents.

In U.S. Pat. No. 5,214,744, the inventors describe a method for automatically identifying targets in sonar images where they point out that "the noisy nature of sonar images precludes the use of line and edge detection operators." Seismic data is also generally recognized as being highly noisy. However, the present invention has been proven to provide a process for accurately delineating hydrocarbon accumulations directly from seismic data. Therefore, it might be expected that, at least in some cases, the present invention might provide another and possibly better process for accomplishing the task described in the sonar patent cited at the start of this paragraph.

U.S. Pat. No. 5,732,697 discloses a "Shift-Invariant Artificial Neural Network for Computerized Detection of Clustered Microcalcifications in Mammography." In this disclosure "a series of digitized medical images are used to train an artificial neural network to differentiate between diseased and normal tissue." The present invention might also find application in delineating diseased tissue from the normal or healthy tissue.

U.S. Pat. No. 5,775,806 discloses an Infrared Assessment System for evaluating the "functional status of an object by analyzing its dynamic heat properties using a series of infrared images." The present invention might also be used to delineate zones of differing functionality in a series of infrared images.

U.S. Pat. No. 5,776,063, "Analysis of Ultrasound Images in the Presence of Contrast Agent," describes "an analysis system designed to detect 'texture' characteristics that distinguish healthy tissue from diseased tissue." The cited patent also points out that the invention "can be applied to characterizing two-dimensional image data derived from X-rays, MRI devices, CT, PET, SPECT, and other image-generating techniques." The present invention can also be applied to detecting and delineating texture characteristics that distinguish healthy tissue from diseased tissue.

U.S. Pat. No. 5,777,481, "Ice Detection Using Radiometers," discloses an invention that uses "atmospheric radiation as an indicator of atmospheric conditions." The present invention can be used to delineate the regions of atmospheric water vapor, cloud water, and ice; and it might be used in conjunction with the cited patent to also identify the content of the regions delineated.

A great deal of recent research has been published relating to the application of artificial neural networks in a variety of contexts. Some examples of this research are presented in the U.S. patents cited above. Therefore, the purpose of the present invention is not to teach how neural networks might be constructed, but rather to disclose how they can be used to delineate spatially dependent objects from patterns in the data obtained from some sensing process, in particular hydrocarbon accumulations from seismic data, which has been a long standing need prior to the present invention.

While many different types of artificial neural networks exist, two common types are back propagation and radial basis function (RBF) artificial neural networks. Both of these neural network architectures, as well as other architectures, can be used in the method, system, and process disclosed by the present invention. However, the exemplary embodiments used to disclose the method, system, and process of the present invention will be based on the back propagation model.

The system and method disclosed in a co-pending U.S. patent application Ser. No. 08/974,122, "Optimum Cessation of Training in Neural Networks," which is incorporated herein by reference, is described and utilized in the present invention. However, the system and method disclosed in the co-pending application is merely an expedient used to facilitate the system, method, and process of the present invention. It is not essential to the application of the system, method, and process of the present invention.

It is thus apparent that those of ordinary skill in their various arts will find a wide range of application for the present invention. It is, therefore, intended by the appended claims to cover all such applications as fall within the true spirit and scope of the present invention.

It is also apparent that there has been a long existing need in the art to be able to accurately delineate spatially dependent objects from patterns in the data acquired from some sensing process. The present invention provides such a system, method, and process.

FEATURES OF THE INVENTION

The above-mentioned, long existing needs have been met in accordance with the present invention disclosing a system, method, and process for delineating spatially dependent objects from patterns in the data acquired from some sensing process.

It is therefore one objective of the present invention to disclose how neural networks can be used to delineate spatially dependent objects from patterns in the data acquired from some sensing process.

It is yet another objective of the present invention to disclose how the technique is applied to the automated delineation of hydrocarbon accumulations from seismic data.

It is yet another objective of the present invention to disclose how the appropriate number of nodes and activation function can be determined prior to starting the overall delineation process.

It is yet another objective of the present invention to disclose a system, method, and process for quickly delineating spatially dependent objects, from patterns in the data acquired from some sensing process, when partial knowledge or even intuition as to the approximate delineation is known or can be surmised.

It is yet another objective of the present invention to provide a system, method, and process for detecting the direction in which an object, accumulation, or cluster lies when the sliding window of the present invention is sitting on the edge of the object, accumulation, or cluster.

It is yet another objective of the present invention to provide a system, method, and process for delineating spatially dependent objects, from patterns in the data acquired from some sensing process, when no a priori knowledge or intuition exists as to the delineation.

It is yet another objective of the present invention to provide a system, method, and process for determining whether or not distinguishable object(s) even exist within the data acquired from some sensing process. For example, whether or not it is possible to delineate regions that are characteristic of hydrocarbon reservoirs, within the area covered by a given seismic survey. This objective is accomplished either when a priori knowledge is available, or when no a priori knowledge as to the existence of such delineation, accumulation, reservoir, region, or cluster exists.

It is yet another objective of the present invention to provide a system, method, and process for separating different sub-objects, sub-regions, or sub-clusters that might exist within a given set of data arising out of some sensing process. For example, separating the gas cap from the oil water contact (OWC) in a gas and oil field using seismic data, or separating different porosity, permeability, and productivity zones within a hydrocarbon reservoir. This objective is accomplished even when no a priori knowledge as to the existence of such sub-delineation, sub-accumulation, sub-region, or sub-cluster exists.

It is yet another objective of the present invention to disclose a method for internally validating the correctness of the delineations derived from the system, method, and process of the present invention.

It is yet another objective of the present invention to indicate how the general application of the concepts disclosed in the present invention can be applied to a variety of fields, designs, and physical embodiments and to fit the specific characteristics of different sensory inputs and/or different output requirements.

It is yet another objective of the present invention to indicate that the general concepts disclosed in the present invention can be implemented in parallel on different machines and can be embedded directly in hardware to expedite processing.

Finally, it is yet another objective of the present invention to provide a system, method, and process for predicting future reservoir behavior, i.e. reservoir simulation. This objective is accomplished by combining the methods for detecting and delineating hydrocarbon carbon accumulations, and subdivisions within the accumulations, directly from seismic data with a priori knowledge related to completion times, production, and pressure properties. Thereby providing a method for reservoir simulation based on the actual parameters present in a particular hydrocarbon accumulation.

In accordance with these and other objectives, the system, method, and process of the present invention are based on the utilization of a neural network to discriminate between differing regions, accumulations, or clusters that can be detected from the patterns present in the data arising out of some sensing process. The neural network classifies particular areas of the data as being either In or Out of a particular region, accumulation, or cluster.

The above as well as additional objects, features, and advantages of the present invention will become apparent in the following detailed written description.

SUMMARY OF THE INVENTION

A method is provided for the automated delineation of hydrocarbon accumulations from seismic data gathered in an existing or prospective oil and/or gas field including the steps of developing a neural network using wellbore data indicating productive areas and data indicating nonproductive areas and applying the neural network to at least a portion of the seismic data to distinguish producing areas from non-producing areas of the oil field. The wellbore data indicating productive areas may be gathered from preexisting wells or from wells systematically planned using information provided by the present invention. Also, the data indicating nonproductive areas may be gathered from either an area assumed to be non-productive or from "dusters", i.e. dry wells. The seismic data may be acquired from recording seismic, or any other suitable, data from dynamite, Vibroseis, Thumper, nuclear explosion, earthquake or any other technology or natural event that produces shock waves, or any other type of data which is used to image or display the characteristics of the subsurface of the earth. The method may also be used to distinguish sub-regions within major accumulations, such as porosity, permeability, high or low productivity zones, etc.

One embodiment of the invention provides a method of delineating hydrocarbon accumulations from seismic data gathered in an oil and/or gas field even when no wells have been drilled, including the steps of developing a neural network within a conceptual sliding window to distinguish accumulations, and applying the neural network to at least a portion of the seismic data to distinguish areas characteristic of hydrocarbon reservoirs from areas without characteristics of hydrocarbon reservoirs. The sliding window may include an "In" portion and an "Out" portion.

One embodiment of the invention provides a method of delineating mineral accumulations from data relating to a given area including the steps of developing a neural network to distinguish producing areas from non-producing areas of the given area and applying the neural network to at least a portion of the data to distinguish producing areas from non-Express producing areas. The data may be seismic data, aeromagnetic data, gravity data or any other type of suitable data.

One embodiment of the invention provides a method of delineating spatially dependent characteristics in a given area from data relating to the given area including the steps of developing a neural network to detect and delineate anomalies and applying the neural network to at least a portion of the data to delineate anomalies within the given area. The characteristics may relate to temperature, tissue differences, composition of the material in the area, etc.

One embodiment of the invention provides a method of determining the accuracy of a neural network used for delineating spatially dependent objects from data related to a given area including the steps of developing a first neural network to detect and delineate anomalies in the given area, applying the first neural network to at least a portion of the data to create scores relating to sub-areas of the area, wherein high and low scores indicate the presence or absence of objects within the given area, creating training sets and test sets using data relating to sub-areas which scored high and low relative to the remaining sub-areas, developing a second neural network using the training and test sets to detect and delineate anomalies in the given area, applying the second neural network to at least a portion of the data to create scores relating to sub-areas of the area, and comparing the results of the first, second, third, etc. neural networks to determine the accuracy of a neural network to discriminate on the given data.

BRIEF DESCRIPTION OF THE DRAWINGS

The novel features believed characteristic of the invention are set forth in the appended claims. The invention itself however, as well as a preferred mode of use, further objects, aspects and advantages thereof, will be best understood from the following detailed description of an illustrative embodiment when read in conjunction with the accompanying drawings, wherein:

FIG. 14 shows a hypothetical seismic layout with a split-sliding window.

FIG. 15 shows a hypothetical seismic layout in a hypothetical Oil and Gas field.

DETAILED DESCRIPTION OF THE PREFERRED EMBODIMENT

Definitions

Figure 1:
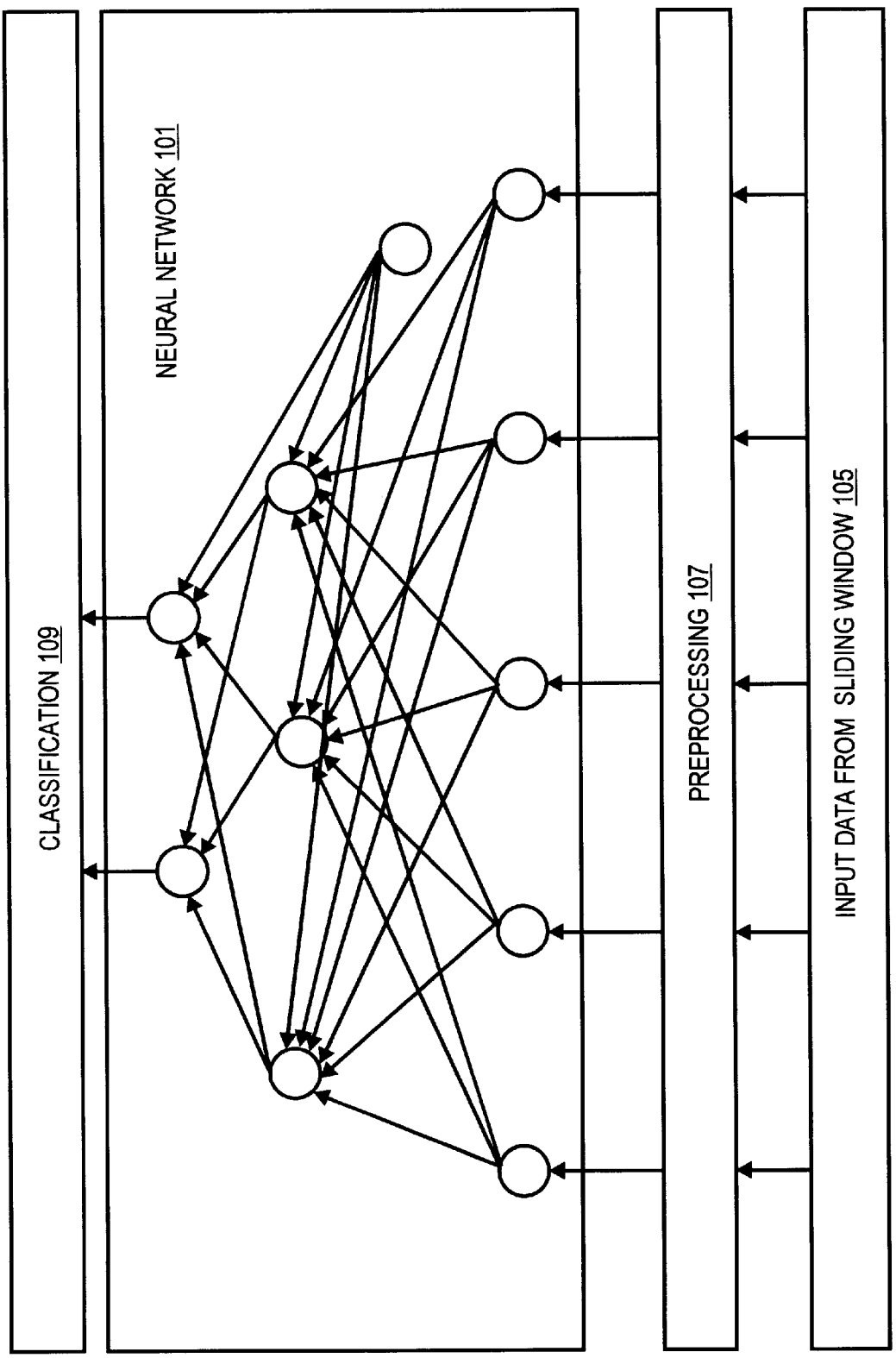
FIG. 1 is a schematic diagram of a neural network.

"Node" a single neuron-like computational element in a neural network.

"Weight" an adjustable value or parameter associated with a connection between nodes in a network. The magnitude of the weight determines the intensity of the connection. Negative weights inhibit node firing while positive weights enable node firing.

"Connection" are pathways between nodes, that correspond to the axons and synapses of neurons in the human brain, that connect the nodes into a network.

"Learning Law" an equation that modifies all or some of the weights in a node's local memory in response to input signals and the values supplied by the activation function. The equation enables the neural network to adapt itself to examples of what it should be doing and to organize information within itself and thereby learn. Learning laws for weight adjustment can be described as supervised learning or unsupervised learning or reinforcement learning. Supervised learning assumes that the desired output of the node is known or can be determined from an overall error. This is then used to form an error signal, which is used to update the weights. In unsupervised learning the desired output is not known and learning is based on input/output values. In reinforcement learning the weights associated with a node are not changed in proportion to the output error associated with a particular node but instead are changed in proportion to some type of global reinforcement signal.

"Activation function" or "Transfer function" a formula that determines a node's output signal as a function of the most recent input signals and the weights in local memory.

"Back propagation" in a neural network is the supervised learning method in which an output error signal is fed back through the network, altering connection weights so as to minimize that error.

"Input layer" the layer of nodes that forms a passive conduit for entering a neural network.

"Hidden layer" a layer of nodes not directly connected to a neural network's input or output.

"Output layer" a layer of nodes that produce the neural network's results.

"Optimum Training Point" is that point in the training of a neural network where the variance of the neural network has reached a minimum with respect to results from a test set 202 which is, in the case of the present invention, taken from the conceptual sliding window 205 that is comprised of data from some sensing process.

Overview

The invention described below relates in general to a method and system for data processing and, in particular, to a method and system for the automated delineation of anomalies or objects in one, two, and/or three dimensional space from data that contains patterns related to the existence of the objects. For example, seismic data frequently contains patterns from which hydrocarbon accumulations can, by use of the present invention, be detected and delineated through the use of neural networks. Using the invention in this manner may include the following steps. First, developing a neural network. Second, applying the neural network to the entire seismic survey. Third, using the neural network to predict production from contemplated wells.

Following is a brief overview of the invention. The invention is based on the utilization of a neural network to discriminate between differing regions, accumulations, or clusters of hydrocarbon accumulations that can be detected from the patterns present in seismic data. The neural network classifies particular areas of the data as being either In or Out of a particular region, accumulation, or cluster. The present invention provides a method for automating the process of analyzing and interpreting seismic data.

To understand how this is achieved, assume as shown in FIG. 1, a neural network architecture(s) 101 having an input layer, one or more hidden layers, and an output layer, where each layer has one or more nodes and all nodes in the input layer are connected to an adjacent but different portion of the data from some sensing process. Each node in the input layer is connected to each node in the first, and possibly only, hidden layer, each node in the first hidden layer is connected to each node in the next hidden layer, if it exists, and each node in the last hidden layer is connected to each node in the output layer. Each connection between nodes has an associated weight. The output layer outputs a classification 109 (described below). Neural network 101 further includes a training process (not illustrated in FIG. 1) for determining the weights of each of the connections of the neural network.

Figure 2:
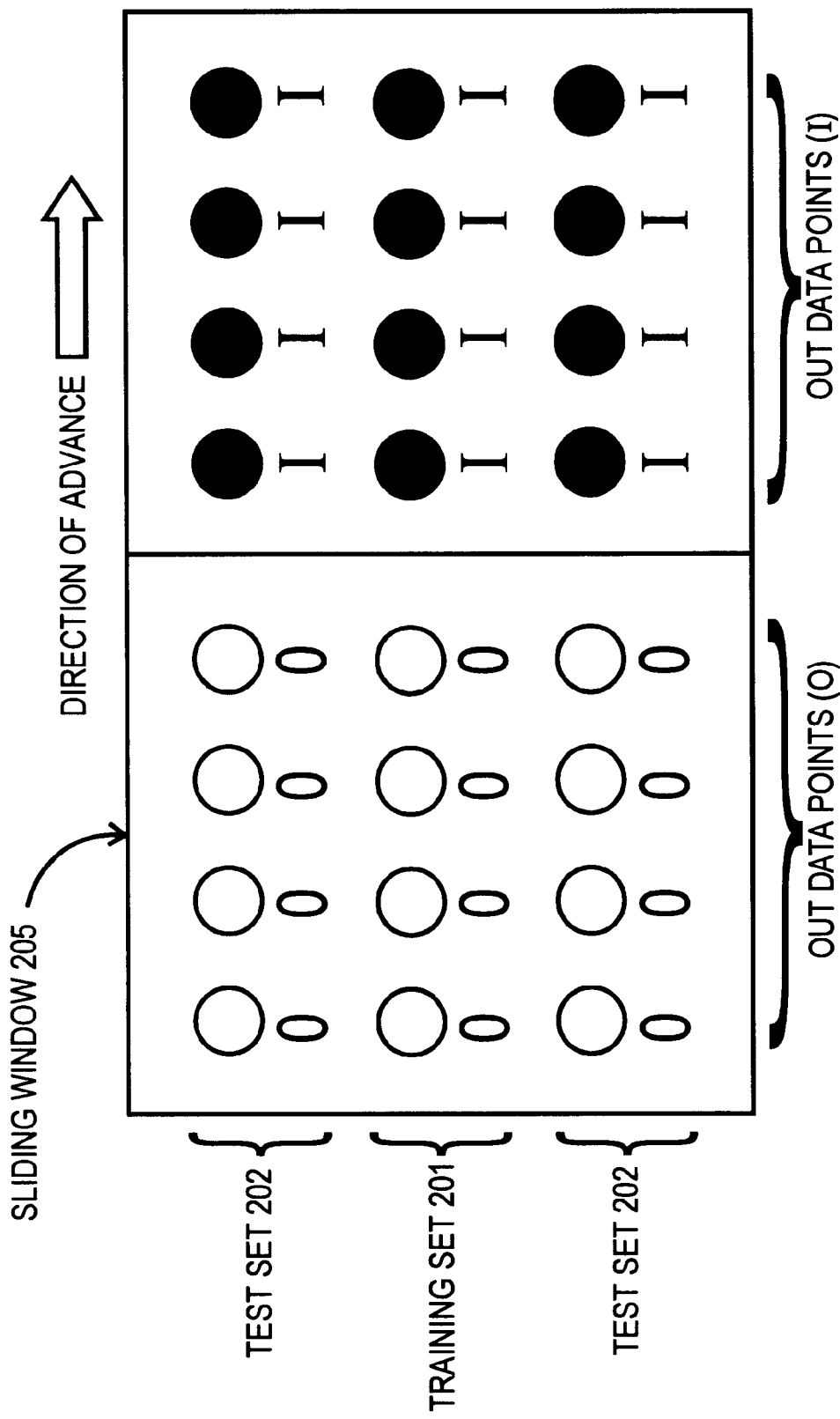
FIG. 2 shows a schematic diagram of the conceptual sliding window used by the present invention.

Furthermore, assume for the exemplary two dimensional case, as shown in FIG. 2, a conceptual sliding window composed of a training/test set combination, consisting of three adjacent lines each of which contains linearly adjacent portions of the data derived from some sensing process (described in more detail below). The middle of the three lines shown in FIG. 2 comprises the training set 201, while the outer two lines make up the test set 202. Preferably, approximately half of the data in each of the three lines is pre-assigned the classification of Out while the other half is pre-assigned the classification of In. Each of the three lines of data is adjacent to one another, and each data point within each line is linearly adjacent to its closest neighboring data point. The classifications of Out and In is contiguous while making up approximately half of the data points in each line. Finally, all of the lines, which for the exemplary case is three, are spatially aligned with one another.

The sliding window of the present invention is a conceptual artifice used to facilitate the reader's understanding of the invention. Thus, it is intended by the appended claims to cover all applications of the invention within the true spirit and scope of the invention regardless of the terminology that might be used to describe the system, method, or process.

The training process applies training set 201 to the neural network in an iterative manner, where the training set is formed from the middle line in the sliding window derived from the data arising out of the sensing process. Following each iteration, the training process determines a difference between the classification produced by the neural network and the classification assigned in the training set. The training set then adjusts the weights of the neural network based on the difference. The error assigned to each node in the network may be assigned by the training process via the use of back propagation.

As is described in more detail below, cessation of training is optimized by executing the following process after each of the training iterations: saving the neural network weights, indexed by iteration number; testing the neural network on the test set 202 portion of the sliding window which is separate from the data in the training set 201; calculating the difference, which is herein referred to as the variance, between the classification produced by the neural network on the test set and the test set's pre-assigned classification; saving the iteration number and current variance when the current variance is less than any preceding variance; and monitoring the variance until it has been determined that the variance is increasing instead of decreasing.

At the point where it has been determined, within some predetermined margin of error, that the variance is increasing (see e.g. reference numeral 1005 of FIG. 10), cessation of training occurs. The iteration number, at which the lowest value of the variance was achieved, is then utilized to retrieve the optimal set of neural network weights for the current position of the sliding window. The variance between the optimal fit to the test set and the values pre-assigned to the test set can either be obtained by applying the optimal set of neural network weights to the test set or by retrieving the variance from storage, if it has been previously stored by the training process during the iterative process.

Next, the sliding window 205 is advanced one data point in relation to the data from the sensing process. That is, starting from the left, the first Out points are dropped from each of the three lines comprising the sliding window. Next, the first three In points become Out points; and finally three new In points are added to the sliding window. The window may move from left to right, right to left, top to bottom, or bottom to top.

The neural network training process then begins again and culminates in a new variance at the optimum cessation of training point. While the sliding window remains entirely outside of a region, accumulation, or cluster the variances at each position of the sliding window will remain high and close to constant. As the sliding window enters a region, accumulation, or cluster to be detected the variance will begin to drop and it will reach a minimum when the sliding window is centered on the edge of the region, accumulation, or cluster to be detected.

Once a region, accumulation, or cluster has been detected, the region, accumulation, or cluster can be delineated by presenting the complete data to the neural network weights that were obtained where the edge was detected.

Detailed Description

Following is a more detailed description of the preferred embodiment of the invention. The present invention is a neural network method and system for delineating spatially dependent objects such as hydrocarbon accumulations. The process relies on a neural network to generate a classification. FIG. 1 shows a neural network 101, input data from a sliding window 105, preprocessing block 107, and a classification as to Out or In 109. The neural network 101 generates a classification 109 from input data applied to its input layer. The inputs to the neural network are selected from the data arising out of some sensing process. The preprocessing block 107 as shown in FIG. 1 may preprocess data input to the neural network. Preprocessing can be utilized, for example, to normalize the input data.

Figure 5:
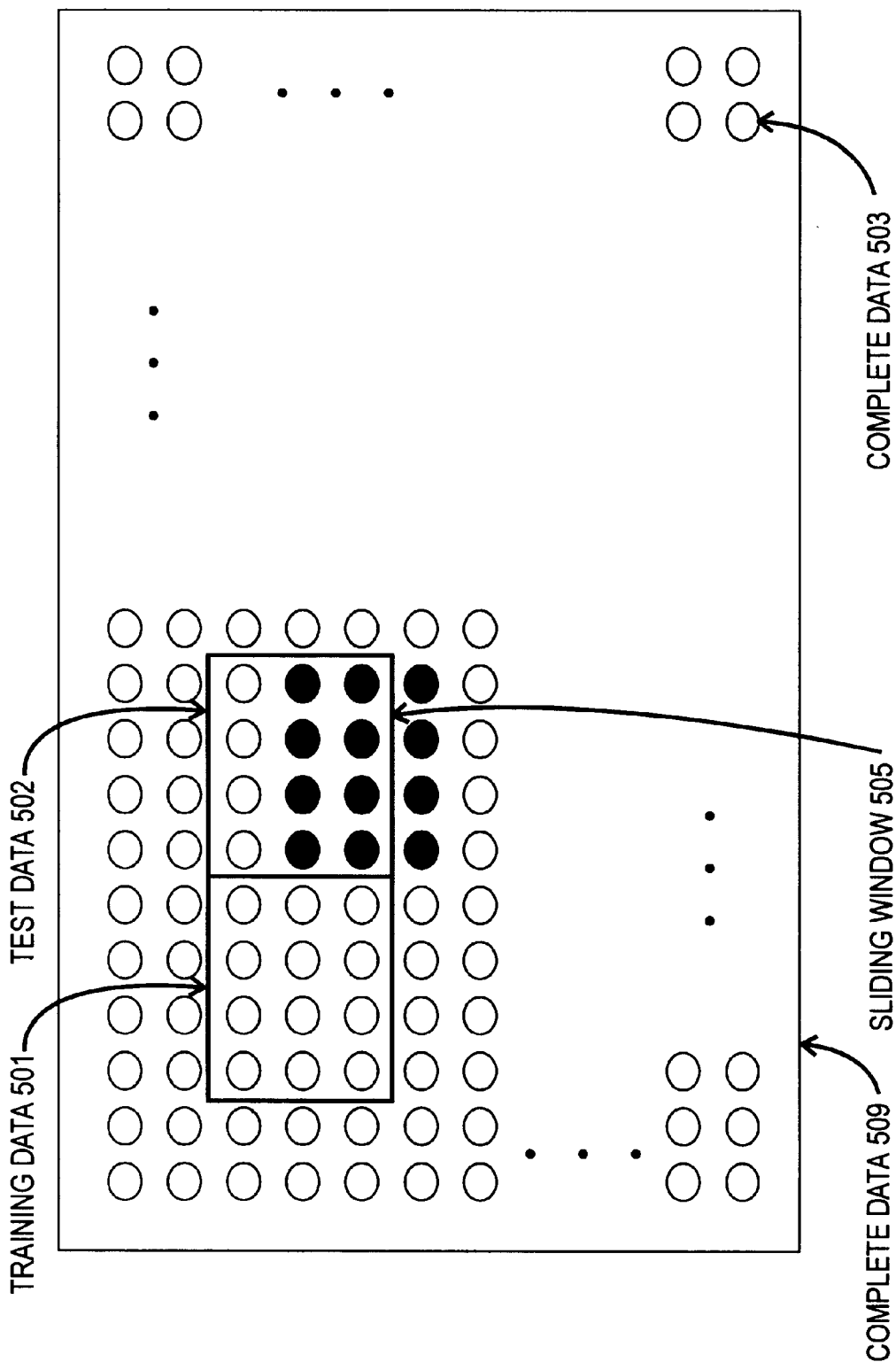
FIG. 5 depicts the relationship between training data, test data, and the complete data set.

Assuming a classification system for detecting and delineating possible hydrocarbon reservoirs from seismic data, FIG. 2 depicts a sliding window 205 comprised of a combination training set 201 and a test set 202. The sliding window 205 comprised of the training/test set combination, includes, in the exemplary embodiment, of three adjacent lines each of which contains linearly adjacent portions of the data derived from the seismic data FIG. 14. The middle of the three lines 201 shown in FIG. 2 comprises the training set, while the outer two lines 202 make up the test set. Approximately, and preferably, half of the data in each of the three lines is assigned the classification of Out while the other half is assigned the classification of In. Each of the three lines of data are adjacent to one another, and each data item within each line are linearly adjacent to its closest neighboring data item 503. The classifications of Out and In are contiguous and make up approximately, and preferably, half of the data points in each line. Finally, the three lines are spatially aligned with one another. FIG. 5 depicts the relationship between the complete data 509, the sliding window 505, the training data 501, and the test data 502 for an arbitrary point in the complete data from some sensing process.

The present invention contemplates that other configurations of the sliding window will be used in delineating spatially dependent objects. Accordingly, it is intended by the appended claims to cover all such applications as fall within the true spirit and scope of the present invention.

The neural network 101 operates in four basic modes: training, testing, operation and retraining. During training the neural network 101 is trained by use of a training process that presents the neural network with sets of training data. The training set 201 consists of linearly adjacent data divided approximately equally into Out and In classifications. The neural network 101 generates a classification based on the similarity or diversity of the data in the training set. This classification is then compared with the classifications previously assigned in the training set. The difference between the classification 109 generated by the neural network and the pre-assigned classifications is used to adjust the neural network weights. During training the neural network learns and adapts to the inputs presented to it, see FIG. 10 and the Mean Square Error curve 1003. The Mean Square Error curve 1003 continues an overall decline as the number of iterations increases. At the end of each training iteration, the test set 202 is presented to the neural network. This test set 202 consists of adjacent data taken from the sensing process. The test set 202 is also pre-assigned the classifications of Out and In as for the training set 201, but the data in the test set 202 does not duplicate any of the data in the training set 201. The test set 202 data is taken from adjacent lines, and it is spatially aligned with and taken from both sides of the training data. The classification resulting from the test set 202 being presented to the neural network is then compared with the pre-assigned classifications from the test set 202 and a variance 1001 is calculated. The variance 1001 is monitored at the end of each iteration to determine the point when the variance starts increasing, see FIG. 10 and the variance curve 1001. At the point where the variance 1001 starts increasing, i.e. has reached a minimum, training is halted.

Figure 9:
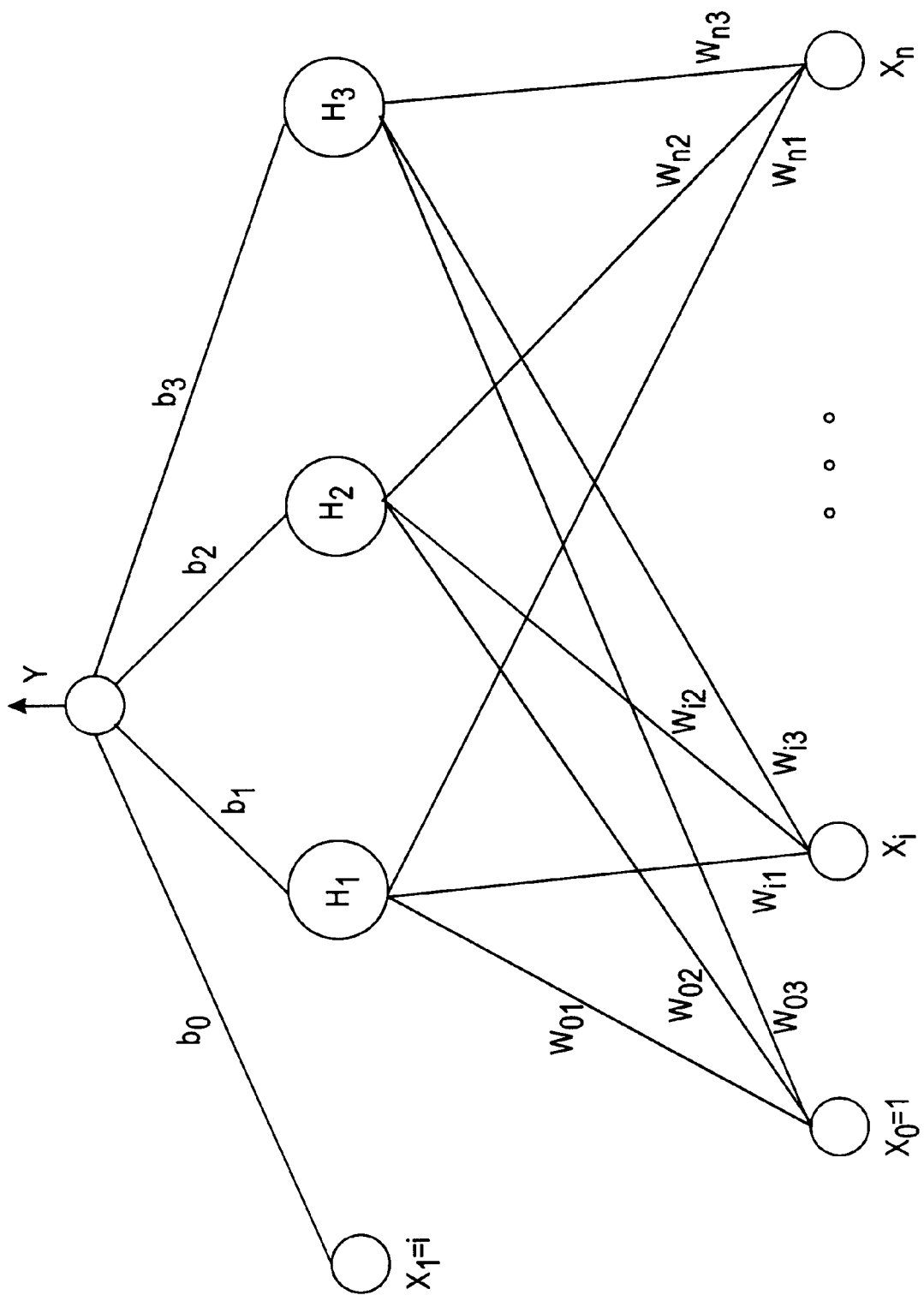
FIG. 9 shows a neural network model with its weights indicated.

After the neural network 101 has been trained, the neural network weights FIG. 9, which occurred at the point where the minimum variance 1001 was obtained, are either retrieved from storage, if they were stored during the iterative process, or they are recalculated to obtain the optimal set of neural network weights for the current position of the sliding window 205. The variance 1001, between the test set 202 classifications as calculated by the neural network at the optimal cessation of training point and the pre-assigned values in the test set 202, can either be obtained by applying the optimal set of neural network weights to the test set 202 or by retrieving the variance 1001 from storage, if it has been previously stored by the training process during the iterative process.

Next, the sliding window 205 is advanced one data point in relation to the data from the sensing process. That is, starting from the left, the first Out points are dropped from each of the three lines comprising the sliding window 205. Next, the first three In points become Out points; and finally three new In points are added to the sliding window 205.

The neural network training process then begins again and culminates in a new variance 1001 at the optimum cessation of training point. While the sliding window 205 remains entirely outside of a region, accumulation, or cluster the variances 1001 at each position of the sliding window 205 will remain high and close to constant. As the sliding window 205 enters a region, accumulation, or cluster to be detected the variance 1001 will begin to drop and it will reach a minimum when the sliding window 205 is centered on the edge of the region, accumulation, or cluster to be detected. The above steps FIG. 6 describe the training and test modes of the neural network.

Once a region, accumulation, or cluster has been detected, the region, accumulation, or cluster can be delineated by presenting the complete data 509 to the neural network weights that were obtained where the edge was detected. This mode of operation is called operational mode.

Advantages of Being Able to Dynamically Cease Training at or Near the Optimal Point Neural networks are trained by a training process that iteratively presents a training set to the neural network through its input layer 405. The goal of the training process is to minimize the average sum-squared error 1003 over all of the training patterns. This goal is accomplished by propagating the error value back after each iteration and performing appropriate weight adjustments FIG. 6. After a sufficient number of iterations, the weights FIG. 9 in the neural network begin to take on the characteristics or patterns in the data. Determining when, i.e. the iteration number at which, the neural network has taken on the appropriate set of characteristics has, prior to the method disclosed in the co-pending U.S. patent application Ser. No. 08/974,122, "Optimum Cessation of Training in Neural Networks," (incorporated by reference herein) been a problem. In real world situations, where noise is embedded along with the patterns in the data, it is commonly recognized that the neural network fits the underlying pattern first and then begins to memorize the data. By memorizing the data the neural network is thus taking on the characteristics of the noise as well as the characteristics of the underlying pattern. This condition is referred to as over fitting or over training the network. This is why training should be stopped at the optimum time.

The overall goal is to train the neural network to the point where the underlying pattern has been detected but the noise has not yet been incorporated into the weights. However, prior to the co-pending U.S. patent application Ser. No. 08/974,122, this has been a difficult task. As a result, typical prior art neural networks are commonly trained either to the point where the average sum-squared error on the training set is reduced to a given level; or a predetermined number of iterations has been exceeded.

This prior art method of halting training is costly in several ways. Neural networks are frequently over trained, thus wasting valuable time while creating neural networks that are not as accurate as possible in their classifications. This is particularly the case when addressing the problem of delineating spatially dependent objects. The developer of the neural network is unable to tell whether or not the neural network is over trained or under trained and comparison of the variances 1001 at different positions is, therefore, inaccurate at best. The co-pending U.S. patent application Ser. No. 08/974,122, discloses a method for overcoming these limitations and facilitates the present invention. Therefore, a detailed description of the method and system of the co-pending application is included herein.

Detailed Description of an Exemplaryneural Network

In order to appreciate the various aspects and benefits produced by the present invention a good understanding of neural network technology is helpful. For this reason the following section discusses neural network technology as applicable to the preferred neural network of the present invention. Of course, the invention is not limited to the types of neural networks described in this description.

Artificial or computer neural networks are computer simulations of a network of interconnected neurons. A biological example of a neural network is the interconnected neurons of the human brain. It should be understood that the analogy to the human brain is important and useful in understanding the present invention. However, the neural networks of the present invention are computer simulations, which provide useful classifications based on input data provided in specified forms, which in the case of the present invention is data from some sensing process.

A neural network can be defined by three elements: a set of nodes, a specific topology of weighted interconnections between the nodes and a learning law, which provides for updating the connection weights. Essentially a neural network is a hierarchical collection of nodes (also known as neurons or nuerodes or elements or processing elements or preceptrons), each of which computes the results of an equation (transfer or activation function). The equation may include a threshold. Each node's activation function uses multiple input values but produces only one output value. The outputs of the nodes in a lower level (that is closer to the input data) can be provided as inputs to the nodes of the next highest layer. The highest layer produces the output(s). A neural network where all the outputs of a lower layer connect to all nodes in the next highest layer is commonly referred to as a feed forward neural network.

Figure 4:
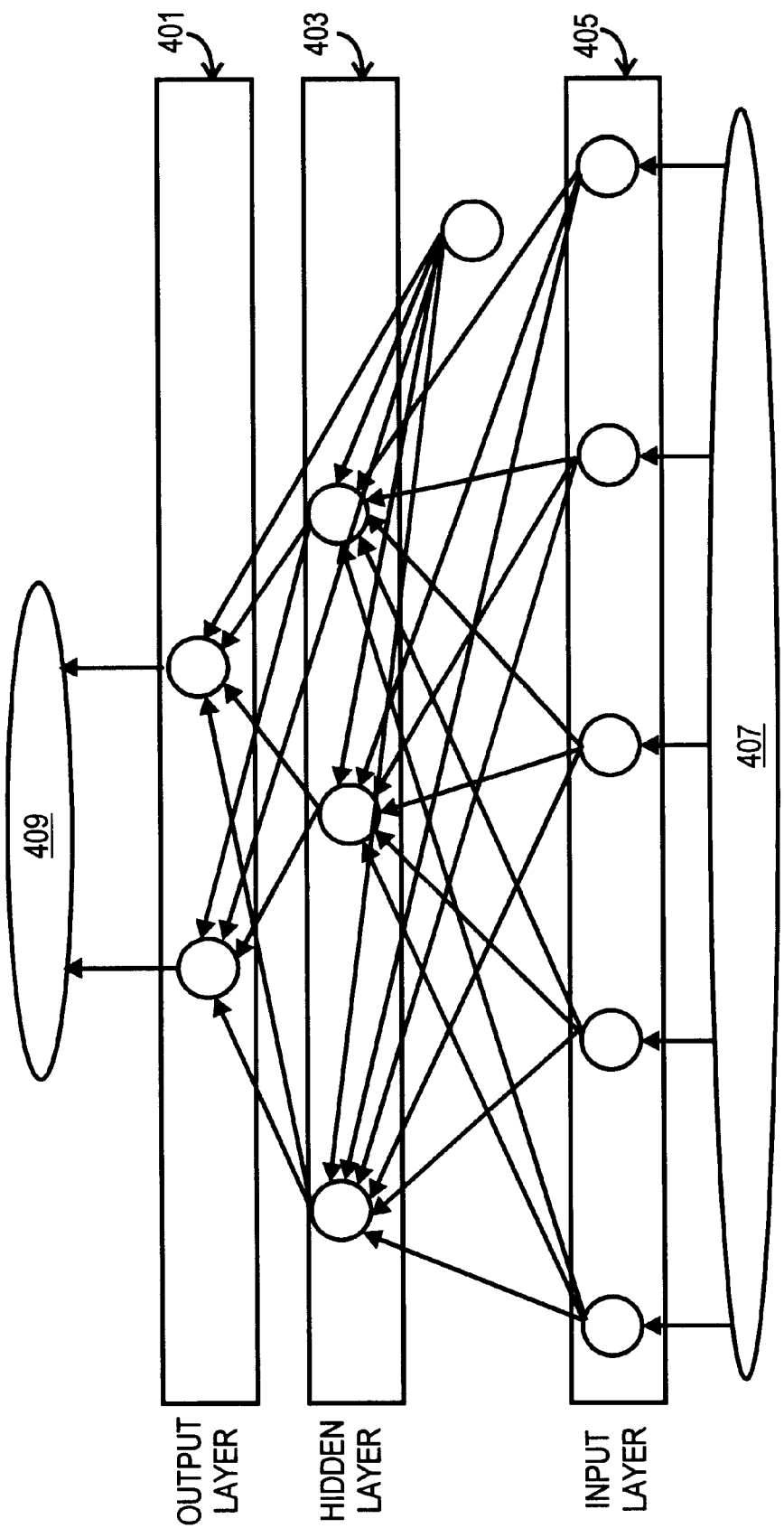
FIG. 4 shows a neural network with an input layer, a hidden layer and an output layer.

Referring now to FIG. 4, a representative example of a neural network is shown. It should be noted that the example shown in FIG. 4 is merely illustrative of one embodiment of a neural network. As discussed below other embodiments of a neural network can be used with the present invention. The embodiment of FIG. 4 has an input layer 405, a hidden layer (or middle layer) 403 and a output layer 401. The input layer 405 includes a layer of input nodes which take their input values 407 from the external input which, in the case of the present invention, consists of data from some sensing process and pre-assigned Out/In classifications. The input data is used by the neural network to generate the output 409 which corresponds to the classification 109. Even though the input layer 405 is referred to as a layer of the neural network, input layer 405 does not contain any processing nodes; instead it uses a set of storage locations for input values.

The next layer is called the hidden or middle layer 403. A hidden layer is not required, but is usually used. It includes a set of nodes as shown in FIG. 4. The outputs from nodes of the input layer 405 are used as inputs to each node in the hidden layer 403. Likewise the outputs of nodes of the hidden layer 403 are used as inputs to each node in the output layer 401. Additional hidden layers can be used. Each node in these additional hidden layers would take the outputs from the previous layer as their inputs. Any number of hidden layers can be utilized.

The output layer 401 may consist of one or more nodes. As their input values they take the output of nodes of the hidden layer 403. The output(s) of the node(s) of the output layer 401 are the classification(s) 409 produced by the neural network using the input data 407 which, in the case of the present invention, consists of data from some sensing process and the pre-assigned classifications.

Each connection between nodes in the neural network has an associated weight, as illustrated in FIG. 9. Weights determine how much relative effect an input value has on the output value of the node in question. Before the network is trained, as illustrated in the flow chart of FIG. 6, random values 600 are selected for each of the weights. The weights are changed as the neural network is trained. The weights are changed according to the learning law associated with the neural network (as described below).

When the inputs of each node of a layer are connected to all of the outputs of the nodes in the previous layer, the network is called "fully connected." If all nodes use output values from nodes of a previous layer the network is a "feed forward network." Note that if any node uses output values from nodes of a later level the network is said to have feedback. The neural network shown in FIG. 4 is a fully connected feed forward neural network.

A neural network is built by specifying the number, arrangement and connection of the nodes of which it is comprised. In a highly structured embodiment of a neural network, the configuration is fairly simple. For example, in a fully connected network with one middle layer (and of course including one input and one output layer), and no feedback, the number of connections and consequently the number of weights is fixed by the number of nodes in each layer. Such is the case in the example shown in FIG. 4.

In a neural network that has nodes having the same activation function, the total number of nodes in each layer has to be determined. This determines the number of weights and total storage needed to build the network. Note that more complex networks require more configuration information, and therefore more storage. The present invention will shortly disclose a method for the selection of the appropriate number of nodes and activation function to include in a neural network used to delineate spatially dependent objects.

The present invention contemplates many other types of neural network configurations for use in delineating spatially dependent objects. All that is required for a neural network is that the neural network be able to be trained so as to provide the needed classification(s).

Referring to FIG. 4, a representative embodiment of a feed forward neural network will now be described. This is only illustrative of one way in which a neural network can function. Input data 407 is provided to input storage locations called input nodes in the input layer 405. The hidden layer 403 nodes each retrieve the input values from all of the inputs in the input layer 405. Each node has a weight with each input value. Each node multiples each input value times its associated weight, and sums these values for all of the inputs. This sum is then used as input to an equation (also called a transfer function or activation function) to produce an output or activation for that node. The processing for nodes in the hidden layer 403 can be preformed in parallel, or they can be performed sequentially. In the neural network with only one hidden layer 403 as shown in FIG. 4, the output values or activations would then be computed. For each output node, the output values or activations from each of the hidden nodes is retrieved. Each output or activation is multiplied by its associated weight, and these values are summed. This sum is then used as input to an equation which produces as its result the output data or classification 409. Thus, using input data 407 a neural network produces a classification or output 409, which is the predicted classification.

Nodes

Figure 8:
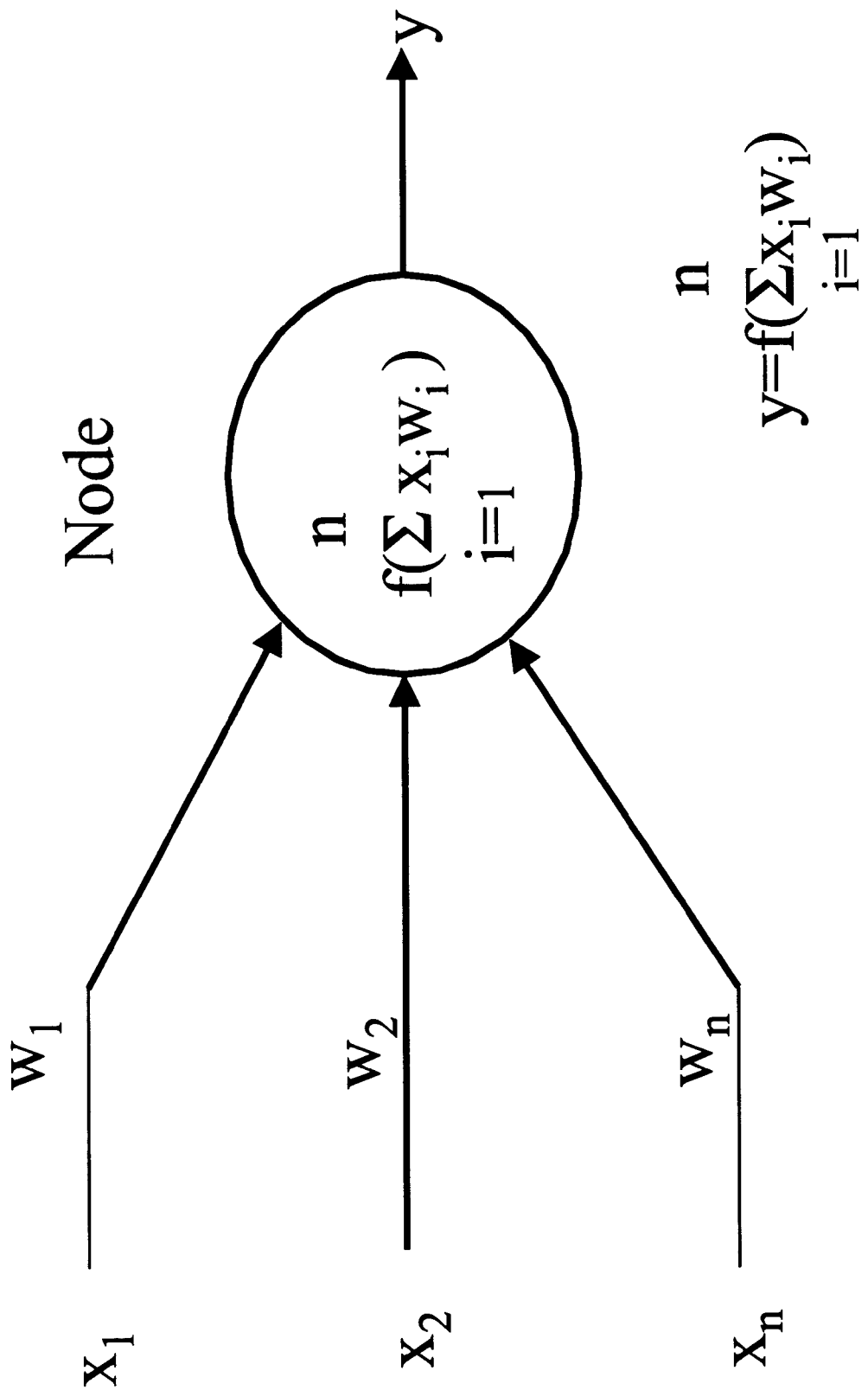
FIG. 8 depicts an embodiment of a node in a neural network.

A typical node is shown in FIG. 8. The output of the node is a nonlinear function of the weighted sum of its inputs. The input/output relationship of a node is often described as the transfer function or activation function. In most neural networks all the equations for all the nodes are the same (although the weights and inputs will differ). The activation function can be represented symbolically as follows:

$$y = f(\Sigma w_i x_i)$$

It is the weighted sum, $\Sigma w_i x_i$, that is inputted to the node's activation function. The activation function determines the activity level or excitation level generated in the node as a result of an input signal of a particular size. Any function may be selected as the activation function. However, for use with back propagation a sigmoidal function is preferred. The sigmoidal function is a continuous S-shaped monotonically increasing function which asymptotically approaches fixed values as the input approaches plus or minus infinity. Typically the upper limit of the sigmoid is set to +1 and the lower limit is set to either 0 or −1. A sigmoidal function is shown in FIG. 7(c) and can be represented as follows:

$$f(x) = 1/(1 + e^{-(x+T)})$$

where x is a weighted input (i.e., $\Sigma w_i x_i$) and T is a simple threshold or bias.

Note that the threshold T in the above equation can be eliminated by including a bias node in the neural network. The bias node has no inputs and outputs a constant value (typically a +1) to all output and hidden layer nodes in the neural network. The weights that each node assigns to this one output becomes the threshold term for the given node.

This simplifies the equation to $f(x)=1/(1+e^{-X})$ where X is weighted input (i.e., $\Sigma w^i x_i$ where $x_0=1$ and $w_0$ is added as a weight.) FIG. 9 depicts a neural network with a bias node (i.e. $x_0=1$) as does FIG. 1.

Referring to the three layer feed-forward network in FIG. 9. This neural network has an input layer that distributes the weighted input to the hidden layer, which then transforms that input and passes it to an output layer, which performs a further transformation and produces an output classification. In this example the hidden layer contains three nodes $H_1$, $H_2$, and $H_3$ as shown in FIG. 9. Each node acts as a regression equation by taking the sum of its weighted inputs as follows:

$$H_{i(IN)} = w_{0i} + w_{1i}x_1 \ldots + w_{ni}x_{bn}$$

where $(W_{0i}, \ldots, w_n)$ are the weights associated with each of the inputs $(x_0, \ldots, x_n)$, with $x_0=1$, for hidden node $H_i$.

Using a sigmoidal activation function for the hidden nodes, each hidden node transforms this input using a sigmoidal activation function such that:

$$H_{i(OUT)} = 1/(1+e^{-Hi(IN)})$$

where $H_{i(OUT)}$ is the output of hidden node $H_i$.

The output of each hidden node is multiplied by the weight of its connection to the output node (i.e., $b_i$). The results of these multiplications are summed to provide the input to the output layer node; thus the input of the activation function of the output node is defined as:

$$Y_{IN} = b_0 + b_1 H_{1(OUT)} + b_2 H_{2(OUT)} + b_3 H_{3(OUT)}$$

The forecast or predicted value, Y, is obtained by a sigmoidal transformation of this input:

$$Y = 1/(1+e^{-YIN})$$

The actual values of the connection weights $[(w_{01}, \ldots, w_{n1}), (W_{02}, \ldots, W_{n2}), (W_{03}, \ldots, w_{n3})], [b_0, b_1, b_2, b_3]$ are determined through training. See the section below that describes training of the neural network. Note that although a sigmoidal activation function is the preferred activation function, the present invention may be used with many other activation functions. FIG. 7(a) depicts a hard-limiter activation function. FIG. 7(b) depicts a threshold logic activation function. FIG. 7(c) depicts a sigmoidal activation function. Other activation functions may be utilized with the present invention as well.

Inputs

A neural network accepts input data 407 via its input layer 405 (FIG. 4). In the case of the present invention this input takes the form of data from some sensing process as well as pre-assigned classifications as to Out or In. When the sliding window 205 or 505 crosses an edge of an object that is detectable in the data arising out of some sensing process, the optimal training point variance 1001 is lower than it is at points adjacent to the edge location of the sliding window 205.

Training

As was stated previously, each connection between nodes in the neural network has an associated weight. Weights determine how much relative effect an input value has on the output value of the node in question. Before the network is trained, random values are selected for each of the weights. The weights are changed as the neural network is trained. The weights are changed according to the learning law associated with the neural network.

The weights used in a neural network are adjustable values which determine (for any given neural network configuration) the predicted classification for a given set of input data. Neural networks are superior to conventional statistical models for certain tasks because neural networks can adjust these weights automatically and thus they do not require that the weights be known a priori. Thus, neural networks are capable of building the structure of the relationship (or model) between the input data and the output data by adjusting the weights, whereas in a conventional statistical model the developer must define the equation(s) and the fixed constant(s) to be used in the equation.

Figure 3:
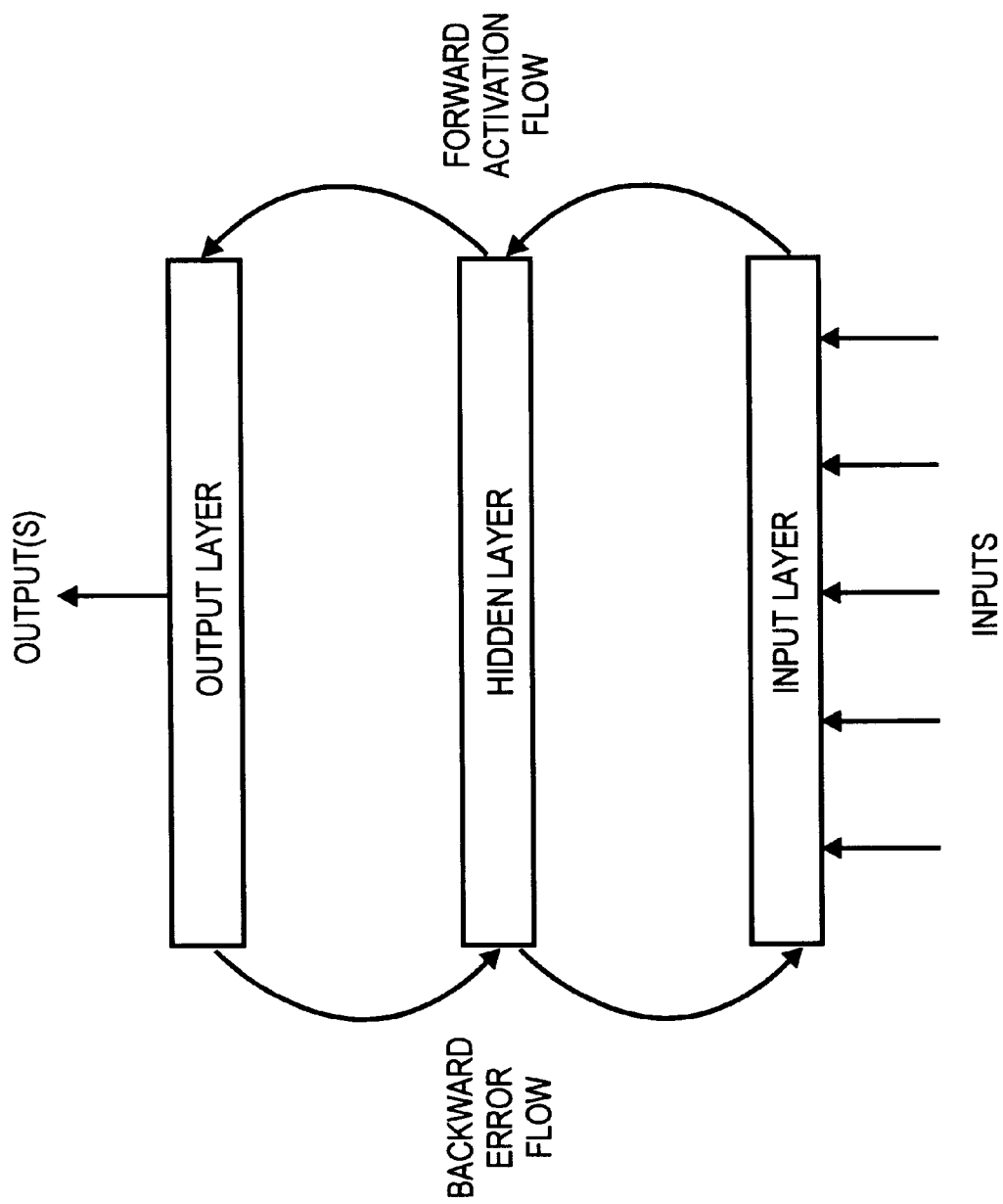
FIG. 3 shows information flow between the layers of a neural network while using back propagation for training.
Figure 6:
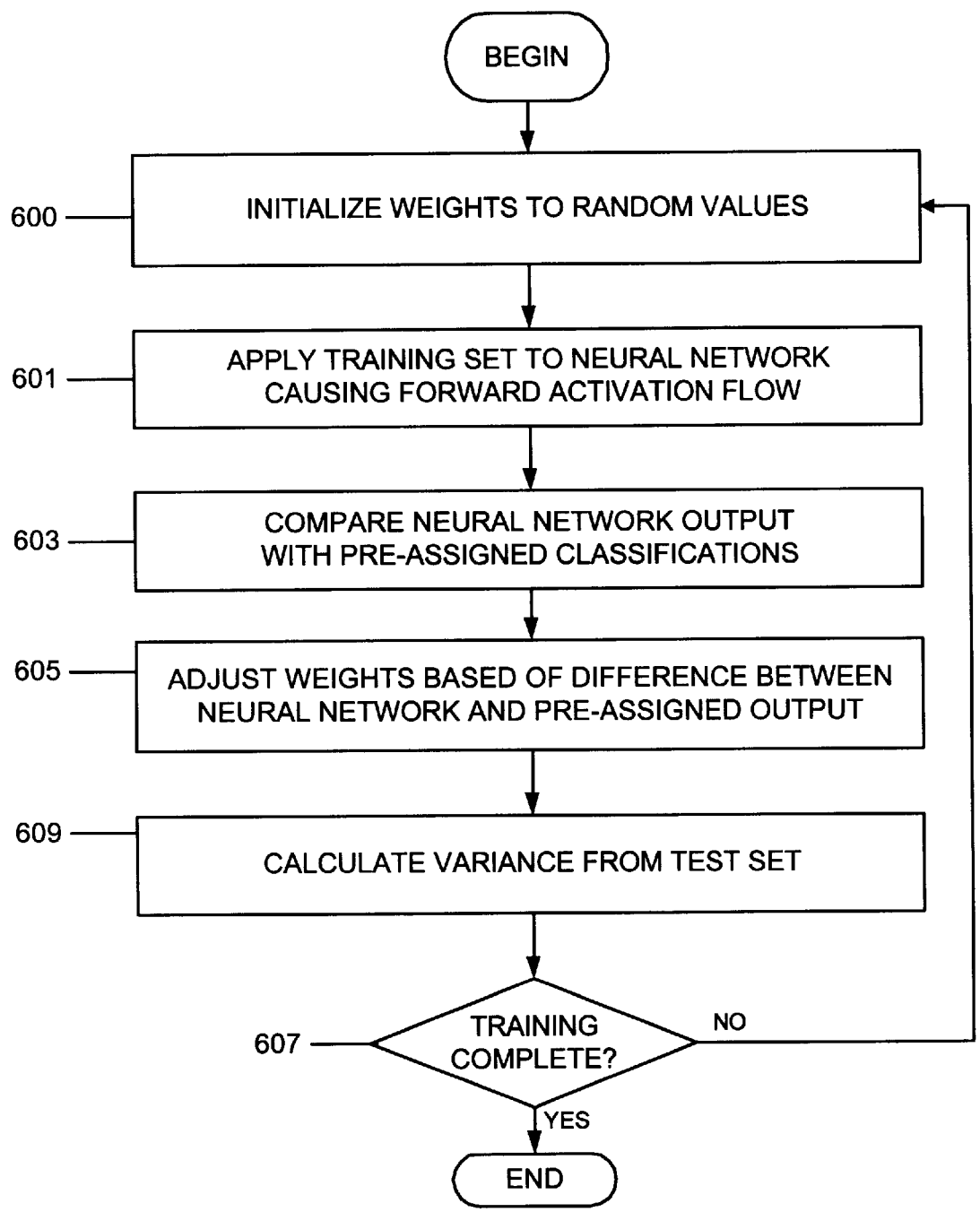
FIG. 6 shows the steps required for training the neural network.

The adjustment of weights in a neural network is commonly referred to as training or learning. Training a neural network requires that training data 201 (FIG. 2) be assembled for use by the training process. In the case of the present invention, this consists of the data from some sensing process and pre-assigned classifications as to Out or In. The training process then implements the steps shown in FIG. 6 and described below. Referring now to FIG. 6, the present invention is facilitated by, but not dependent on, this particular approach for training the neural network. In step 600 the weights are initialized to random values. When retraining the neural network step 600 may be skipped so that training begins with the weights computed for the neural network from the previous training session(s). In step 601 a set of input data is applied to the neural network. As described previously, this input causes the nodes in the input layer to generate outputs to the nodes of the hidden layer, which in turn generates outputs to the nodes of the output layer which in turn produces the classification required by the present invention. This flow of information from the input nodes to the output nodes is typically referred to as forward activation flow. Forward activation is depicted on the right side of FIG. 3.

Returning now to FIG. 6, associated with the input data applied to the neural network in step 601 is a desired (actual or known or correct) output value. In the case of the present invention, this consists of the pre-assigned Out/In classifications, although they are not actually known in this case. In step 603 the classification produced by the neural network is compared with the pre-assigned classifications. The difference between the desired output, i.e. pre-assigned classifications, and the classification produced by the neural network is referred to as the error value. This error value is then used to adjust the weights in the neural network as depicted in step 605.

One suitable approach for adjusting weights is called back propagation (also commonly referred as the generalized delta rule). Back propagation is a supervised learning method in which an output error signal is fed back through the network, altering connection weights so as to minimize that error. Back propagation uses the error value and the learning law to determine how much to adjust the weights in the network. In effect, the error between the forecast output value and the desired output value is propagated back through the output layer and through the hidden layer(s). Back propagation distributes the overall error value to each of the nodes in the neural network, adjusting the weights associated with each node's inputs based on the error value allocated to it. The error value is thus propagated back through the neural network. This accounts for the name back propagation. This backward error flow is depicted on the left-hand side of FIG. 3.

Once the error associated with a given node is known, the node's weights can be adjusted. One way of adjusting the weights for a given node is as follows:

$$W_{new}=W_{old}+\beta EX$$

where E is the error signal associated with the node, X represents the inputs (i.e., as a vector), $W_{old}$ is the current weights (represented as a vector), and $W_{new}$ is the weights after adjustment, and $\beta$ is a learning constant or rate. $\beta$ can be thought of as the size of the steps taken down the error curve. Other variations of this method can be used with the present invention. For example the following:

$$W_{new}=W_{old}+\beta EX+\alpha(W_{new}-W_{old})_{prev}$$

includes a momentum term, $\alpha(W_{new}-W_{old})_{prev}$, where $\alpha$ is a constant that is multiplied by the change in the weight from a previous input pattern.

According to the back propagation method, which is illustrative of training methods that can be used for the neural network, an error value for each node in the hidden layer is computed by summing the errors of the output nodes each multiplied by its associated weight on the connection between the hidden node in the hidden layer and the corresponding output nodes in the output layer. This estimate of the error for each hidden layer node is then used in the manner described above to adjust the weights between the input layer and the hidden layer.

It can thus be seen that the error between the output data and the training input data is propagated back through the network to adjust the weights so that the error is reduced. This process is iteratively repeated with the training data 201 until training is complete. As shown in step 607 a test is used to determine whether training is complete or not. Commonly this test simply checks that the error value be less than a certain threshold over a certain number of previous training iterations, or it simply ends training after a certain number of iterations.

A preferred technique is to use a set of testing data 202 and measure the error generated by the testing data. The testing data is generated so that it is mutually exclusive of the data used for training. In the preferred embodiment of the present invention the neural network is allowed to train until the optimum point for cessation of training is reached. The optimum training point is that point in the training of a neural network where the variance 1001 of the neural network classification has reached a minimum with respect to known results from a test set 202 taken from some sensing process and pre-assigned classifications of Out/In. Note that when test data 202 is used to determine when training is completed the weights are not adjusted as a result of applying the testing data to the neural network. That is the test data is not used to train the network.

In summary to train the newly configured neural network the weights are usually initialized by assigning them random values, step 600. During training, the neural network uses its input data to produce predicted output data as described above in step 601. These output data values are used in combination with training input data to produce error data, step 603. The error data is the difference between the output from the output nodes and the target or actual data which, in the case of the present invention, consists of the pre-assigned Out/In classifications. These error data values are then propagated back through the network through the output node(s) and used in accordance with the activation function present in those nodes to adjust the weights, step 605. Calculation of the variance 1001, between the neural network's classification of the test data 202 and the pre-assigned classification of the test data 202, is performed, step 609. A test on the variance 1001 is used to determine if training is complete or more training is required, step 607.

Note that although the preferred embodiment of the present invention has been described with respect to the basic back propagation algorithm, other variations of the back propagation algorithm may be used with the present invention as well. Other learning laws may also be used. For instance, reinforcement learning. In reinforcement learning a global reinforcement signal is applied to all nodes in the neural network. The nodes then adjust their weights based on the reinforcement signal. This is decidedly different from back propagation techniques, which essentially attempt to form an error signal at the output of each neuron in the network. In reinforcement learning there is only one error signal which is used by all nodes.

Training and Testing Data

The neural network is trained by repeatedly presenting it with the training data 201. Turning now to FIG. 5, each training set 501 has a set of data items 503 from some sensing process and a pre-assigned classification value Out or In. The testing set 202 is identical to the training set 201 in structure, but the testing set 202 is distinctly different from the training set 201 in that it does not contain any of the same data items as the training set.

In the case of the present invention, one of the data sets is used as the training set 201, and two other adjacent and aligned data sets are combined to form the testing set 202. In the present invention the test set 202 is configured with one set of data items falling on each side of the training line. The purpose of this data configuration will be disclosed shortly.

Preprocessing

The preprocessing function 107 is depicted in FIG. 1. Preprocessing of the input values may be performed as the inputs are being applied to the neural network or the inputs may be preprocessed and stored as preprocessed values in an input data set. If preprocessing is performed, it may consist of one or more steps. For instance, classical back propagation has been found to work best when the input data is normalized either in the range [−1, 1] or [0, 1]. Note that normalization is performed for each factor of data. For example, in the case of seismic data the amplitudes at each twoway time are normalized as a vector. The normalization step may also be combined with other steps such as taking the natural log of the input. Thus, preprocessing may consist of taking the natural log of each input and normalizing the input over some interval. The logarithmic scale compacts large data values more than smaller values. When the neural net contains nodes with a sigmoidal activation function better results are achieved if the data is normalized over the interval [0.2, 0.8]. Normalizing to the range [0.2, 0.8] uses the heart of the sigmoidal activation function. Other functions may be utilized to preprocess the input values.

Calculating the Variance from Test Set

Figure 10:
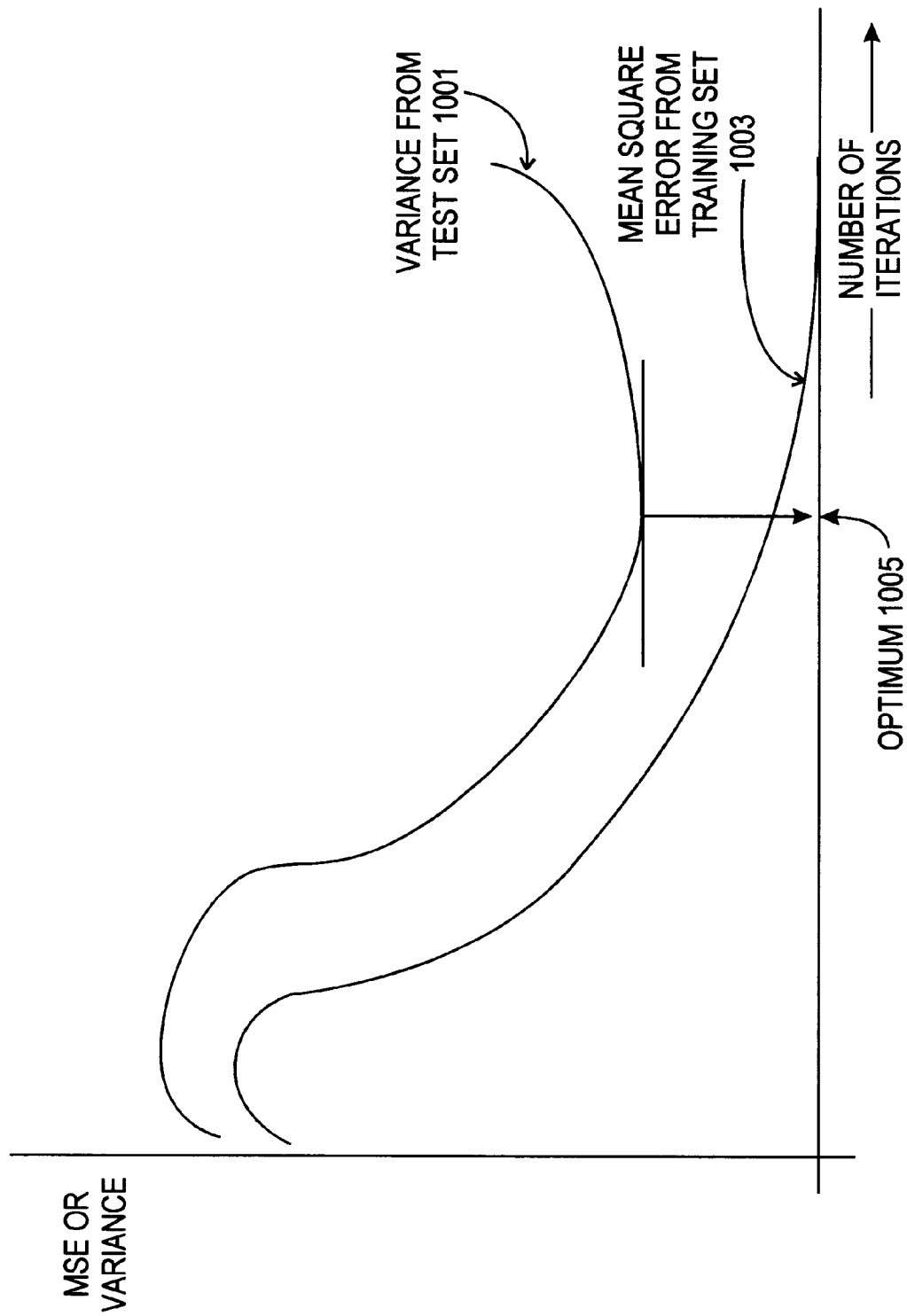
FIG. 10 shows the contrast of the mean squared error as it is related to the variance from a test set.

Referring now to FIG. 6 and FIG. 10, calculating the variance 609, of the neural network's classifications, from the pre-assigned classifications in the test set 202 (as shown as step 609 of FIG. 6); and using this variance to determine the optimum point for ceasing further training facilitates, but is not required by, the present invention. This facilitating aspect, which is the preferred embodiment of the present invention, is now described. After the weights have been adjusted as shown in step 605, the neural network is presented with a test set 202. A variance 1001 is then calculated between the neural network's classification and the pre-assigned classifications in the test set 202. This variance is then used to determine if training has achieved the optimal response from the given neural network, step 607, in which case, training is halted.

Two questions associated with achieving the optimal result are 1) what constitutes the variance, and 2) how is it determined that the optimal variance has been achieved. In FIG. 10 two curves, that are both a function of the number of iterations that the neural network has been trained, are presented. One is the mean square error 1003 derived from the training set 201, and the other is the variance 1001 derived from the test set 202.

The goal of the neural network, while it is training, is to minimize the mean square error 1003 by adjusting the neural network weights after each training iteration. As a result, the neural network fits the training set with a greater and greater degree of accuracy with each iteration, while the mean square error curve 1003 asymptotically attempts to approach zero. Thus, it is, possible for the neural network to fit a given pattern to any arbitrarily chosen degree of accuracy. This, however, is not the overall goal of using a neural network approach to make classifications. The overall goal is to produce a neural network that will generalize on other sets of data that are presented to it. Therefore, there is a point in the iterative process when the neural network has learned the underlying patterns in the training data and is subsequently memorizing the training data including any noise that it may contain.

This over-fitting or over-training problem can be avoided if the neural network trains on the training data 201, but measures its ability to generalize on another set of data, called the testing data 202. This is accomplished by calculating the variance 1001 between the neural network's classification and the pre-assigned classifications from the testing data 202.

The variance can be any function that the system developer finds to be most appropriate for the problem at hand. For example, in the case of classification problems such as delineating spatially dependent objects, the variance 1001 could be the mean square error on the testing data 202, the chi-square test, or simply the number of incorrectly determined responses. Those skilled in the art will quickly understand that many different methods of calculating the variance can be used with equal results without departing from the true spirit and scope of the invention. Step 609 in FIG. 6; represents the point, in the iterative process, at which the variance is calculated.

The iteration at which the variance 1001 reaches a minimum is the optimum point 1005, for any given set of testing data 202, to cease training. At this point the neural network has finished learning the pattern(s) in the training set and is beginning to over-fit or memorize the data. Just as the variance itself can be calculated by a variety of methods, the optimal point to cease training can also be calculated by a variety of methods. It is the point at which the variance ceases to decrease with further training and begins to increase instead. For example, this inflection point can be determined most simply by observing that the variance has not made a new minimum within some given number of iterations, or more complicatedly by performing a running linear regression on the variance for some number of iterations in the past and observing when the slope of the line becomes positive. Those skilled in the art will be able to quickly propose other methods for determining the minimum without departing from the true spirit and scope of the invention. Step 609 of FIG. 6 is the point in the iterative process where the calculations to determine the minimum are carried out.

As a practical matter, the neural network weights may be saved for an appropriate number of iterations in the past. These weights being indexed by the iteration number at which they were achieved. When it has been determined that the inflection point has been reached the iteration number with the lowest value of the variance is used to retrieve the optimum neural network weights.

Delineation of Spatially Dependent Objects

The co-pending U.S. patent application Ser. No. 08/974,122, "Optimum Cessation of Training in Neural Networks," discloses how to optimally halt the training process. This is something that has, heretofore, been a long-standing problem in the use of neural networks. However, a similar problem still exists. That is, how to determine the best number of nodes, i.e. the network architecture, and what activation function(s) to use in a specific neural network architecture. It is, therefore, one objective of the present invention to disclose how to determine the appropriate number of nodes and the activation function to use in a neural network prior to starting the overall process as illustrated in FIG. 11 for delineating spatially dependent objects.

Figure 12:
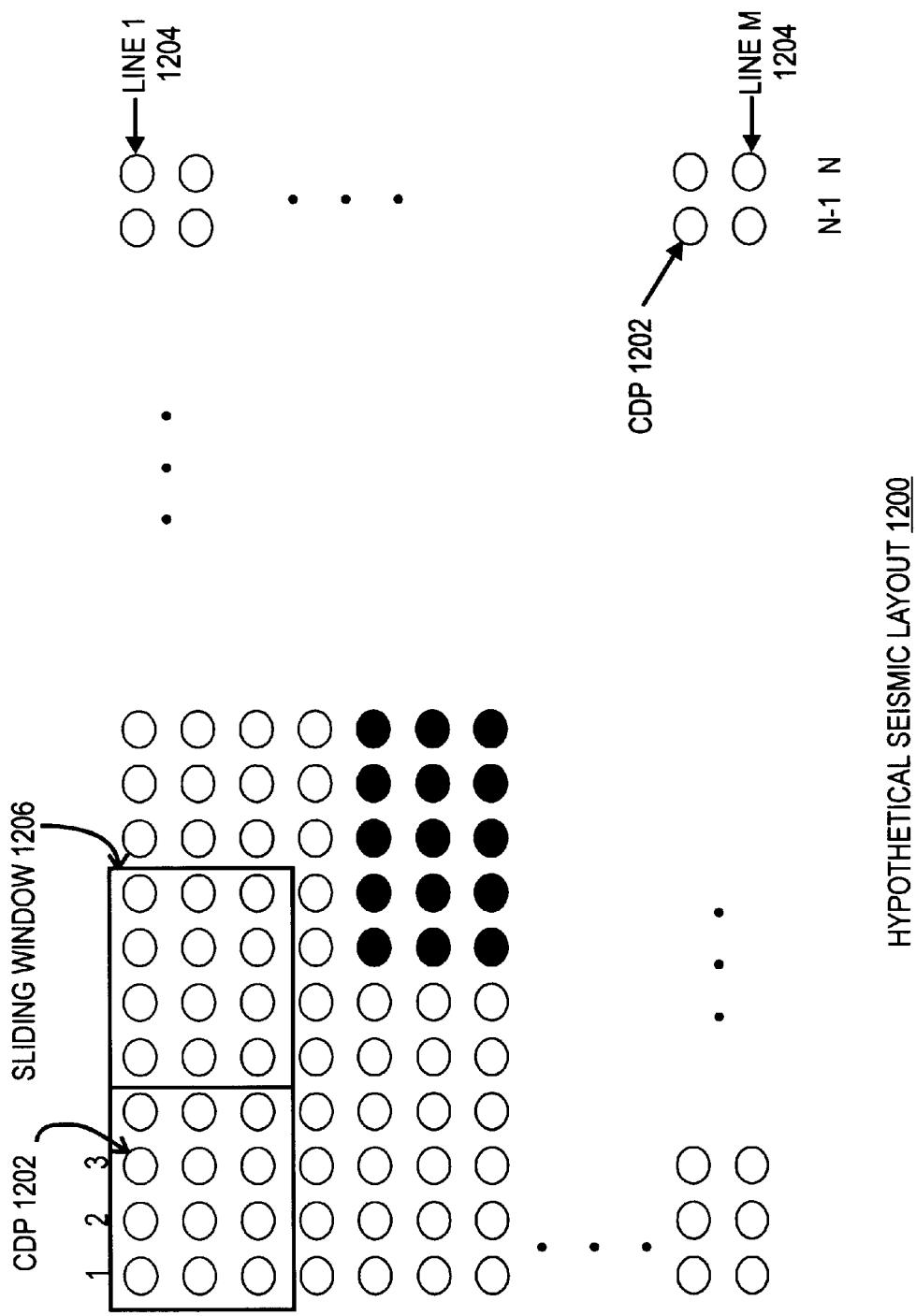
FIG. 12 shows a hypothetical seismic layout.
Figure 13:
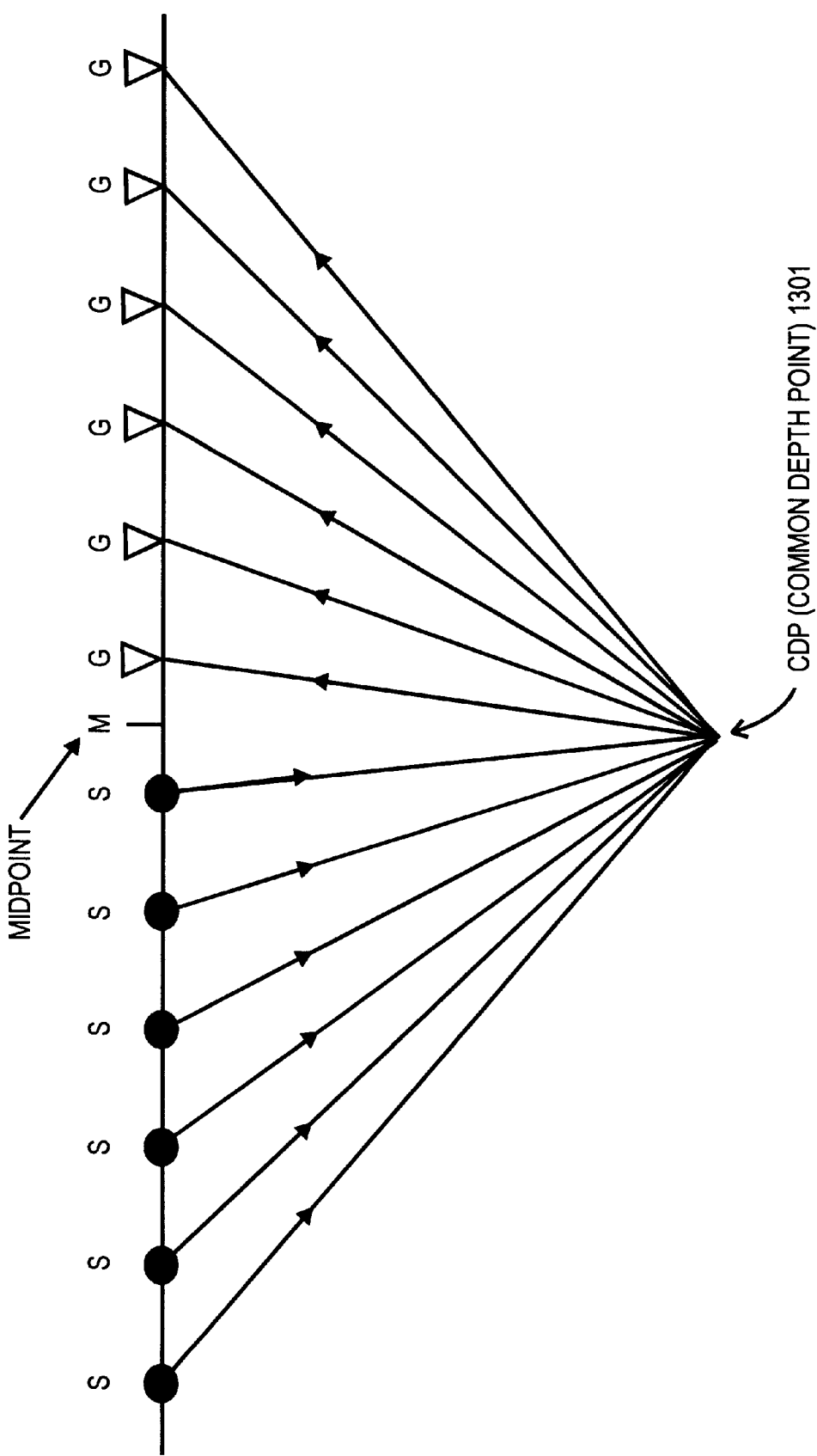
FIG. 13 shows a Common Depth Point (CDP) gather.

The number of nodes required to best solve a particular neural network problem is primarily dependent on the overall structure of the problem, for example the number of variables, the number of observations, the number of output nodes, etc. The actual data values have very little effect on the appropriate number of nodes to use. The data values have much more influence on the number of training iterations that are required. Therefore, the first step 1101 in the process of delineating spatially dependent objects is to determine the best number of nodes to use. This is accomplished by configuring the sliding window 205, locating the window in some area of the data that is thought to be consistent, for example see FIG. 12, and then temporarily and consistently modifying the actual data in the area of the In portion of the sliding window 1206. In the case of seismic data, which is used as an example, one might assume that the upper left corner of a seismic layout, as shown in FIG. 12, is not actually in the oil or gas zone and would offer a good place to determine the best number of nodes. Next, continuing the seismic example, a few specific amplitudes might be temporarily modified to the same value in all CDP gathers, as shown in FIG. 13, that are within the In portion of the sliding window. A consideration in setting the temporary values is not to make the values too distinct, since the objective is to observe the variance make a minimum rather than have it drop immediately to zero. The neural network is then trained to the optimum cessation point for consecutive numbers of nodes. The variance against the test set 202 for each number of nodes is stored and tracked, and after it is apparent that a particular number of nodes has produced a minimum the process is stopped. The number of nodes at which the minimum was achieved is used throughout the delineation process.

Figure 7:
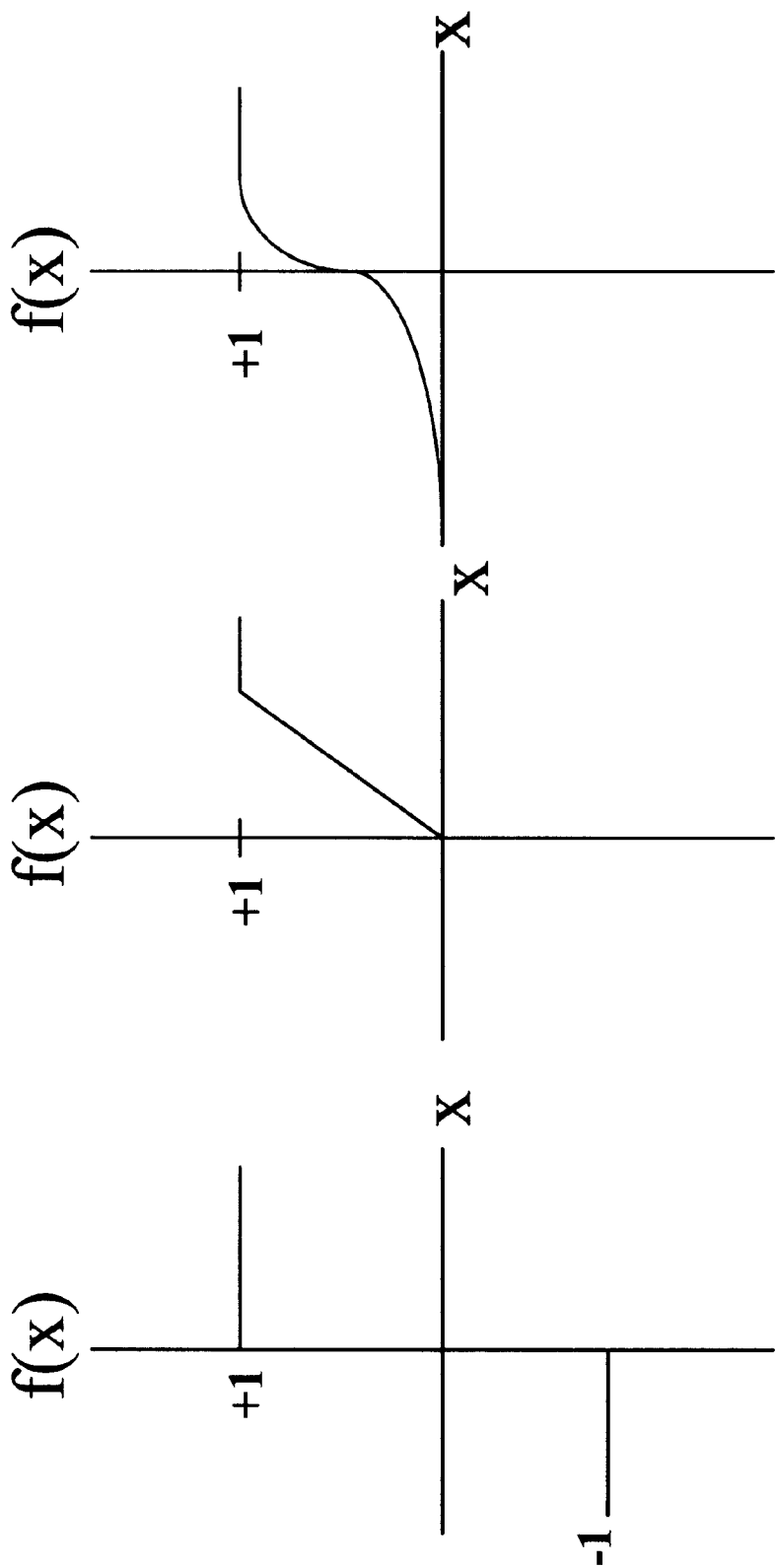
FIG. 7(a) shows a hard-limited activation function.
FIG. 7(b) shows a threshold logic activation function.
FIG. 7(c) shows a sigmoid activation function.
Figure 11:
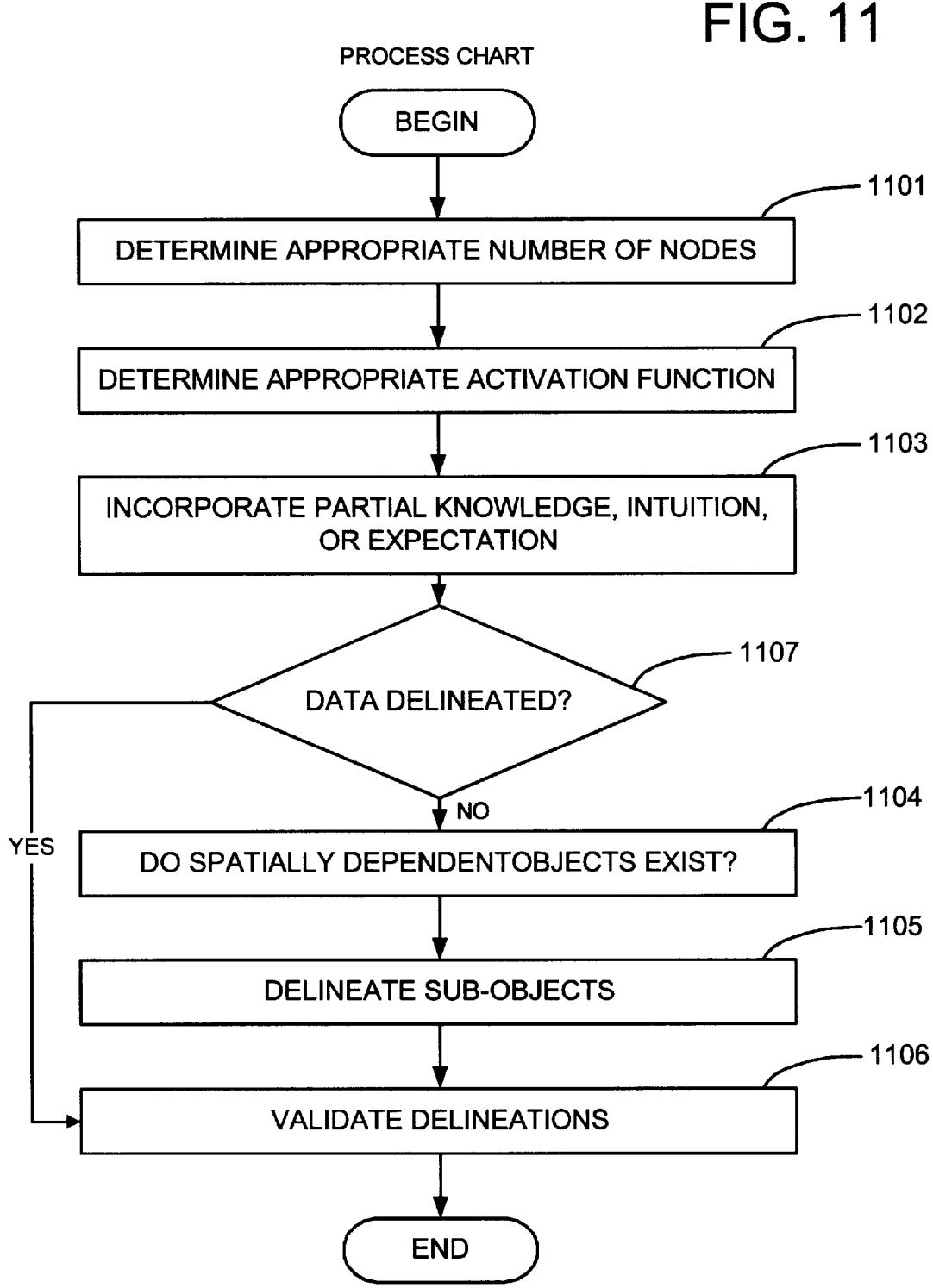
FIG. 11 shows a flow chart of the typical process to be followed in delineating a spatially dependent object.

As shown at step 1102 of FIG. 11, a similar process is used to determine the best activation function, examples of which are shown in FIG. 7. Activation functions perform differently on different types of data, e.g. whether the data is smooth or subject to spikes can affect the performance of different activation functions. Therefore, after obtaining the best number of nodes, i.e. the network architecture, and before restoring the data to its original state, various activation functions are tried on the stationary-sliding window 1206 using the best number of nodes. The variance against the test set 202 for each activation function that is tried is stored and tracked. Finally, the original data is restored, and the activation function that produced the lowest variance is selected as the activation function to use throughout the delineation process.

When partial knowledge, or even intuition, as to the approximate delineation is known or can be surmised, it is possible to use this knowledge, intuition, or expectation to expedite the delineation process. Therefore, it is a further objective of the present invention to disclose how this incomplete knowledge can be incorporated. In the exemplary case of seismic data, this knowledge might come from aeromagnetic profiles or gravity surveys, or even from the experience and judgement of seismic interpreters and geologists. For example, in the seismic case illustrated in FIG. 12, it is common practice to start the seismic shots outside of the suspected oil and/or gas zones and run them in lines across the area under consideration. Therefore, it is considered to be quite likely that CDP gathers in a corner of the layout will be outside of a suspected oil and/or gas zone while the CDP gathers in the suspected oil and/or gas zone will be found in the middle of the seismic layout. In the case of face recognition, a difficult and important spatially dependent neural network problem, it is common to image a person's face against a uniform background. Thus, in the face recognition case, we can expected to find the person's face in the middle of the data while the background can be expected to be found in the corners. We can use this type of partial knowledge, intuition, or expectation to expedite the delineation process.

Thus, the third step 1103 in the process of delineating spatially dependent objects (illustrated in FIG. 11) is the incorporation of partial knowledge, intuition, or expectation. Referring to FIG. 14, which extends the exemplary seismic layout of FIG. 12, we see that the sliding window 1206 of FIG. 12 has been split into two portions 1401 and 1402 in FIG. 14. The Out portion of the split-sliding window 1401 is made stationary in a corner of the seismic layout, while the In portion 1402, which is allowed to slide, is initially located in the middle of the seismic layout 1400. The neural network, composed of both portions of the sliding window is then trained to the optimum point using the number of nodes and activation function found in steps 1101 and 1102 of the delineation process. A quick convergence to a minimum variance that is small in magnitude indicates that some type of accumulation, region, or cluster exists. If the neural network does not quickly converge to a small variance, it may be desirable to move the In sliding window to another position and repeat the process. If the method of the present invention is being used to delineate a major object, full delineation of the object can often be completed after training with partial knowledge, intuition, or expectation. Thus in FIG. 11, a decision is made at block 1107 whether or not delineation is complete after completion of training. If so, the process proceeds to block 1106, which is discussed below. If, on the other hand, delineation is not complete after completion of training, the process proceeds to block 1104.

Information related to the process can, in some circumstances, be derived as result of the way that the sliding window is configured. If one side of the test set 202 converges while the other side does not, it can be concluded that the In portion of the sliding window is sitting on an edge of an accumulation, as shown in 505. Therefore, moving the In portion 502 of the sliding window toward the converging side, i.e. down in FIG. 5, is likely to bring about convergence across both sides of the sliding window. This is the reason for having the test set evenly configured on both sides of the training set. Thus, one objective of the present invention, i.e. detecting the direction in which an object, accumulation, or cluster lies when the sliding window of the present invention is sitting on the edge or corner of the object, accumulation, or cluster, is achieved for both edges. When balanced convergence has been achieved, the complete data set 509 is then passed against the resulting neural network weights to delineate the entire accumulation, region, or cluster.

Many times there is no knowledge or intuition as to the location of spatially dependent objects. In fact, it is often important to know if there is even the possibility of such objects existing within in a given set of data. The latter is particularly important and valuable in the analysis of seismic data. Therefore, it is yet another objective of the present invention to provide a system, method, and process for determining whether or not distinguishable object(s) even exist within the data acquired from some sensing process. For example, whether or not it is possible to delineate regions that are characteristic of hydrocarbon reservoirs, within the area covered by a given set of seismic data. This objective can be accomplished even when no a priori knowledge as to the existence of such delineation, accumulation, region, or cluster exists.

This is accomplished in step 1104 of FIG. 11 by traversing the entire data set with the sliding window 1206. The sliding window is not split, and it is generally started at some corner as shown in FIG. 12. The training process is carried out to the optimum point as before and after each convergence the data set is advanced one data point. That is, the first Out points are dropped from each of the three lines comprising the exemplary sliding window 205. Next, the first three In points become Out points; and finally three new In points are added to the sliding window. The neural network training process then begins again and culminates in a new variance at the optimum cessation of training point. While the sliding window remains entirely outside of a region, accumulation, or cluster the variances at each position of the sliding window will remain high and close to constant. As the sliding window enters a region, accumulation, or cluster to be detected the variance will begin to drop and it will reach a minimum when the sliding window is centered on the edge of the region, accumulation, or cluster to be detected. As before, when strong and balanced convergence has been achieved, the complete data set 509 is passed against the resulting neural network weights to delineate the entire accumulation, region, or cluster. If significant convergence is not achieved, the existence, of accumulations, regions, or clusters is unlikely.

In many cases of spatially dependent objects, the delineation of the major object itself is not sufficient. The delineation of sub-objects with various properties is also required. For example in the case of hydrocarbon accumulations and seismic data, separating the gas cap from the oil water contact (OWC) in a gas and oil field as shown in FIG. 15, or separating zones of differing porosity, permeability or productivity using seismic data is also of great interest and value. Therefore, it is yet another objective of the present invention to provide a system, method, and process for separating different sub-objects, sub-regions, or sub-clusters that might exist within a given set of data arising out of some sensing process.

This objective may be accomplished in step 1105 of FIG. 11 even when no a priori knowledge as to the existence of such sub-delineation, sub-accumulation, sub-region, or sub-cluster exists. Assuming that the entire major object has been delineated, the complete sliding window 1501 is positioned at a point on the edge of the major object on a line along which a sub-object is thought to exist. However, this time the sliding window is positioned completely inside the major object with the out portion adjacent to the edge of the major object. The sliding window is trained to the optimum point and then advanced as previously described. Again the variance at the optimum point is monitored to detect the window position at which the variance is a minimum. When a minimum variance has been found the complete data set 509 or some subset of the complete data set can be passed against the resulting neural network weights to delineate the sub-object. Alternatively, the entire region of the major object can be systematically traversed. The variance, when sub-objects are delineated, can be expected to be greater and the minimum not as distinct as it is in the case of a major object. For example, when separating the gas cap 1502 from the OWC, oil water contact 1503, the optimum-point-variance that occurs when the sliding window is centered on the edge of the gas cap, is expected to be greater than it would be when the Out portion of the sliding window is completely outside of the oil and gas accumulations and the In portion of the sliding window is centered well within the combined oil and gas accumulation. In FIG. 15 the sliding window is at the edge of the OWC and one data point away, assuming movement to the right, from being centered on the edge of the gas cap.

It has been a longstanding problem in the use of neural networks to be able to determine the degree of accuracy a given prediction or classification has achieved. Therefore, it is yet another objective of the present invention to disclose a method for internally validating the correctness, i.e. determining the degree of accuracy of the delineations derived from the system, method, and process of the present invention.

This objective can be achieved in step 1106 of FIG. 11 by first delineating all of the Out and In values, process step 1103 or 1104, for the classification under consideration. An appropriate sized sample for a training set, such as the size used in the sliding window, is then randomly selected from the complete delineation. The training set is trained to the optimum point and the resulting neural network weights are used to reclassify the complete data set 509, less the randomly selected training set, for the classification under consideration. The variance from the original classification is recorded. A new training set is again randomly selected and trained to the optimum point. The reclassification of the entire set of Out and In values is again performed and the variance from the original classification is again recorded. This randomly select, train, and reclassify procedure is repeated for at least thirty (30) times. Standard statistical methods, well known to those skilled in the art, are then used to calculate the mean and confidence interval of the neural network variance for the particular classification under consideration. Major objects in an oil and/or gas field may show a variance of zero, while the sub-objects such as differing porosity zones show a non-zero variance within a narrow confidence interval. This occurs because seismic data overlaps different porosity, permeability and productivity zones. Another novel method for determining the degree of accuracy a given prediction or classification has achieved is described in the section pertaining to the delineation of hydrocarbon accumulations below, and by the appended claims is included in the present invention.

There are a number of areas where the system, methods, and process disclosed by the present invention can find wide applicability. A partial sample of these areas has been revealed in the Background of the Invention section above. Therefore, it has been yet another objective of the present invention to indicate how the general application of the concepts disclosed in the present invention can be applied to a variety of fields, designs, and physical embodiments. Furthermore, the specific characteristics of different sensory inputs can lead to basically the same neural network problem, i.e. the delineation of spatially dependent objects.

Although the concepts disclosed by the present invention are designed for efficiency, the overall process is still computationally intensive. Therefore, it is yet another objective of the present invention to indicate how the concepts disclosed in the present invention can be implemented in parallel on different machines and can be embedded directly in hardware to expedite processing. Parallel processing of the concepts embodied in the present invention can be accomplished in different ways. For example, in the traversal of the data to locate a major object, such as a hydrocarbon accumulation in seismic data, multiple machines can be used. In this case, one position of the sliding window is trained on each machine in parallel; thus advancing the sliding window by the number of machines for each parallel solution of the problem. At the end of each parallel solution, the variance is combined into a single file for monitoring purposes. The pulling together of the variances can be quickly accomplished over a network. Another example of the use of parallel processing in the application of the present invention occurs during the determination of the appropriate number of nodes. In this case, a different number of nodes is trained on each machine and the resulting variances are brought together for evaluation at the end of the parallel run. Again this combining of the variances can be quickly accomplished across a network. A number of other parallel processing implementations can be achieved using the concepts of the present invention, accordingly, it is intended by the appended claims to cover all such applications as fall within the true spirit and scope of the present invention.

Often the recognition of spatially dependent objects needs to take place in real-time. For example, in the case of seismic data, this can prove to be particularly valuable, in saving expensive seismic acquisition time. Therefore, it is yet another objective of the present invention to indicate how the concepts disclosed in the present invention can be implemented for use in real-time. This can be accomplished, in the seismic acquisition case, by making long lines of shots while the individual shot gathers are simultaneously processed along the one-dimensional line using the sliding window technique described above. When an object has been delineated on the one-dimension line, the seismic acquisition can then start mapping the area perpendicular to the one-dimensional object. This may take place with either 2D or 3D seismic acquisition and processing. This approach will allow accurate delineation of hydrocarbon accumulations in an expedited and less expensive manner. This approach can also be used with seismic data acquired using Vibroseis. The same approach can be used with sonar data, to locate a submerged object, such as a downed plane, for example. Those skilled in the pertinent arts will recognize many other examples where the concepts of the present invention can be applied in real-time, accordingly, it is intended by the appended claims to cover all such applications as fall within the true spirit and scope of the present invention.

When performing either a real-time sensing process, as described above, or a static analysis of sensed data the concepts of the present invention can be expedited by embedding the neural network function in hardware. Therefore, the present invention contemplates that various hardware configurations can be used in conjunction with the concepts of the present invention. In fact, neural network integrated circuit chips are commercially available, and could be configured to implement the concepts of the present invention. Accordingly, it is intended by the appended claims to cover all such applications as fall within the true spirit and scope of the present invention.

It is yet another objective of the present invention to provide a system, method, and process for detecting and delineating hydrocarbon accumulations directly from seismic data. A description of how to apply the concepts of the present invention, in an experimental application of the invention, to the delineation of a gas cap in an Oil and Gas Field is used as a non-limiting exemplary embodiment of the application of the present invention.

The Enterprise Miner software from SAS Institute, Inc., can be used in the following experimental, exemplary embodiment to provide the neural network framework in which the present invention is applied. The first task is to define the data to be used in the analysis, and to download it from SEG-Y format to SAS data sets. 3D seismic data, acquired using dynamite with receivers located at twenty-five (25 m) meter spacing, is used. A fold of 72 traces per CDP gather (FIG. 13) is used in the example that follows. The two-way-time to the basement is 1.2 sec and the sampling interval is 2 msec.

In the preferred embodiment of the present invention the entire depositional environment is taken into consideration. This is done so that not only the hydrocarbon accumulation itself is considered; but also such characteristics as traps, migration paths from source rocks, and the underlying basins are considered in the analysis. In the exemplary embodiment of the present invention, all of the amplitudes from the surface to the basement were used and the neural network was allowed to determine where the ground-roll stopped, which it did at around 90 msec. The point where ground-roll ceases is determined by using a sliding window in the vertical direction, instead of horizontally as heretofore described. A delineation of the hydrocarbon accumulation is initially accomplished by using all of the amplitudes from the surface down to the basement. Then a small number of amplitudes (25 in the cited example) is included in a vertically sliding window which is started at the surface and moved downward one amplitude at a time until the results from the 25 amplitudes begin to contribute to the signal strength of the hydrocarbon delineation function, i.e. the 25 amplitudes alone begin to offer a positive contribution toward discrimination on the test set. This point is where ground-roll is no longer the overriding influence. A similar process is performed below the hydrocarbon reservoir to locate the point at which the environmental deposition is no longer an influence in the delineation of the hydrocarbon accumulation. The amplitudes above and below these points are then deleted from further calculations, thereby enhancing the discrimination function on the hydrocarbon accumulation.

Pre-stacked data with NMO (Normal Moveout) applied was used in the cited example. Although, traces taken directly from the field tapes and processed into CDP gathers is the preferred level of processing in the present invention, accurate results can be obtained from various levels of processing. It is contemplated by the present invention that those skilled in the art will use various views of the data and different levels of processing. Accordingly, it is intended by the appended claims to cover all such views of the data and levels of processing as fall within the true spirit and scope of the present invention.

The classification into In (1) or Out (0) is done for each trace in each CDP gather that is either In or Out. Thus, in the cited example where the fold is 72 we have each of the 72 traces, or observations, in a CDP classified as either 1 or 0 depending on whether the CDP is either In or Out. The best results from a neural network are normally obtained when observations in the range of 1.5 to 2 times the number of variables, i.e. all of the amplitudes plus some of the trace header variables in the case of seismic data, are used. Therefore, for a two way time (TWT) of 1.2 seconds sampled at 2 millisecond intervals in the example cited, in the neighborhood of 900 to 1200 observations are required. With 72 traces per CDP, 13 to 17 CDP's are adequate for an accurate solution in the example cited. In addition to the amplitudes, the offset and statics variables from the trace headers were used in the example cited; however, various combinations of trace header variables and amplitudes will yield accurate results; therefore, it is intended by the appended claims to cover all such combinations of variables as fall within the true spirit and scope of the present invention.

Pre-determination of the appropriate number of nodes 1101, and the activation function (1102 and FIG. 7) was carried out as disclosed in the present invention. Furthermore, training to determine the appropriate number of nodes ceased within twenty-five or so iterations of what was later found to be the optimum point in the real classification runs. Since partial knowledge of the gas cap was available, all traces in eight (8) CDP gathers on the periphery of the seismic layout were classified as Out, and all traces in eight (8) centrally located CDP gathers were classified as In. This data was used to make up the training set 201 in the split-sliding window 1401 and 1402. The test set 202 was similarly configured according to the disclosure of the present invention. The split window was run to the optimum cessation of training point, and the remainder of the complete data 509 was then classified. The validation step 1106 revealed that all CDP gathers in the complete data 509 were correctly classified with 100% confidence. As previously disclosed in the present invention, the sliding window was then advanced along a line from the OWC in order to detect the gas cap as shown in FIG. 15.

Historical data pertaining to wells that were known to be in the gas cap or out of the gas cap was also available in the cited example. The data was thus reprocessed with this a priori knowledge and the results were identical to those achieved above. Thus, it is intended by the appended claims of the present invention, which provides a system, method, and process for detecting and delineating hydrocarbon carbon accumulations directly from seismic data, to cover both the conditions where a priori knowledge is available and where it is not.

After the neural network is trained, scoring of all the CDP's in the survey is accomplished in the following manner which also provides yet another, and novel, method for internally validating the correctness, i.e. determining the degree of accuracy of the delineations derived from the system, method, and process of the present invention. Each trace in a CDP, that is to be scored as either In or Out, is presented to the neural network, i.e. each trace is multiplied by the weight vector, to obtain a score between 0 and 1. Rarely, if ever, do the traces score as exactly 0 and 1. It is therefore necessary to determine at what point between 0 and 1 the CDP scores as Out or In. All of the trace scores in a given CDP are averaged to obtain the CDP score, which lies between 0 and 1. When the CDP's that are In are clearly distinguishable from those that are Out, all scores for CDP's that are In are greater than 0.5 and all scores for CDP's that are Out are less than or equal to 0.5. When a priori knowledge from wellbores is available, the points in the CDP score that correctly discriminate the definitely In and definitely Out CDP's can be directly determined from the known classified CDP's. Furthermore, by determining the number of CDP's between the definitely In and definitely Out points, it is possible to determine the degree of accuracy a given prediction or classification has achieved by using the method disclosed above with the known data.

Yet another objective of the present invention is disclosure of a novel method for determining the degree of accuracy a given prediction or classification has achieved when no a priori knowledge is available with which to determine such accuracy. After detection and classification of a hydrocarbon accumulation by the system and method set out above, more neural networks are set up, trained, tested, and classified using CDP's that were not used in the original neural network by which the classification was initially achieved. The training and test sets of these neural networks are composed of CDP's which scored high and low on the initial classification that detected the hydrocarbon accumulation. The sum of the CDP's that consistently score In and consistently score Out is then divided by the total number of CDP's to obtain the accuracy of the prediction or classification. Standard statistical methods, well known to those skilled in the art, can then applied just as they are for determining accuracy when a priori knowledge is available.

Finally, it is yet another novel objective of the present invention to provide a system, method, and process for hydrocarbon reservoir simulation using neural networks. After a hydrocarbon accumulation has been delineated the same set of trace header and amplitude variables from which the delineation was achieved, augmented by cumulative production, bottom hole pressure, and individual wellbore production can be used throughout the life of the reservoir to predict production levels at contemplated well sites. The cumulative production variable consists of the total production from the reservoir up until the time the training or projected well was completed. The bottom hole pressure variable is the average bottom hole pressure throughout the reservoir at the time the training or projected well was completed. The predicted production level variable is the production achieved from either a training or a projected well over some period of time after completion, consistency being more important than the period chosen. The variables used to augment the trace header and amplitude variables are assigned to each trace in the closest CDP to the wellbore. Data from the latest actual wells is not used in the training set and is reserved for the test set. Training of the neural network continues until the variance from this test set is at a minimum. The present invention contemplates that the system, method, and process for hydrocarbon reservoir simulation will be used in conjunction with 4D seismic surveys, accordingly, it is intended by the appended claims to cover all such applications as fall within the true spirit and scope of the present invention.

The present invention contemplates that those skilled in the art will find uses, other than the delineation of spatially dependent objects, for the methods disclosed for determining the best number of nodes, the activation function, the inclusion of partial knowledge or intuition, when to stop training, etc. for use in neural networks related to other applications. Accordingly, it is intended by the appended claims to cover all such applications as fall within the true spirit and scope of the present invention.

SPECIFIC EXAMPLES AND EMBODIMENTS

Discussed above has been the preferred method of operation of the present invention. Discussed in this Section are the preferred structures (architecture) of the present invention. However, it should be understood that in the description set forth above, the modular structure (architecture) of the present invention was also discussed in connection with its operation. Thus, certain portions of the structure of the present invention have inherently been described in connection with the description set forth above. While many different types of artificial neural networks exist, two common types are back propagation and radial basis function (RBF) artificial neural networks. Both of these neural network architectures, as well as other architectures, can be used by the present invention. However, the exemplary embodiments described above were based on the back propagation model.

The preferred embodiment of the present invention comprises one or more software systems. In this context, a software system is a collection of one or more executable software programs, and one or more storage areas, for example, RAM or disk. In general terms, a software system should be understood to comprise a fully functional software embodiment of a function, which can be added to an existing computer system to provide a new function to that computer system.

A software system is thus understood to be a software implementation of a function, which can be assembled, in a layered fashion to produce a computer system providing new functionality. Also, in general, the interface provided by one software system to another software system is well defined. It should be understood in the context of the present invention that delineations between software systems are representative of the preferred implementation. However, the present invention may be implemented using any combination or separation of software systems.

It should be understood that neural networks, as used in the present invention, can be implemented in any way. For example, the preferred embodiment uses a software implementation of a neural network. It should be understood, however, that any form of implementing a neural network can be used in the present invention, including physical analog and digital forms. Specifically, as described below, the neural network may be implemented as a software module in a computer system. Furthermore, the neural network of the present invention may be implemented on one computer system during training and another during operational mode. Thus a neural computer, using parallel processing, could be utilized during the computationally intensive training stage and then once the weights have been adapted the weights and the neural network could be embodied in a number of other computing devices to generate the required classification using the required operational input data. Likewise the neural network might be trained on a single processor and then distributed to a number of parallel processors in the operational mode.

It should also be understood with regard to the present invention that software and computer embodiments are only one possible way of implementing the various elements in the systems and methods. As mentioned above, the neural network may be implemented in analog or digital form. It should be understood, with respect to the method steps as described above for the functioning of the systems as described in this section, that operations such as computing or determining (which imply the operation of a digital computer) may also be carried out in analog equivalents or by other methods.

The neural network, training process may, in a variant of the present invention, be implemented as a single software system. This single software system could be delivered to a computer installation to provide the functions of the present invention. Alternately, a neural network configuration function (or program) could also be included in this software system. A neural network configuration module can be connected in a bi-directional path configuration with the neural network. The neural network configuration module is used by the user (developer) to configure and control the neural network in a fashion as discussed above in connection with the step and module or in connection with the user interface discussion contained below. A number of commercial packages contain neural networks operating in this manner, e.g. Enterprise Miner from SAS Institute, Inc. and BDS (Business Discovery Solutions) from IBM Corporation of Armonk, N.Y.

The neural network contains a neural network model. As stated above, the present invention contemplates all presently available and future developed neural network models and architectures. The neural network model can have a fully connected aspect, or a no feedback aspect. These are just examples. Other aspects or architectures for the neural network model are contemplated.

The neural network has access to input data and access to locations in which it can store output data and error data. One embodiment of the present invention uses an approach where the data is not kept in the neural network. Instead, data pointers are kept in the neural network, which point to data storage locations (e.g., a working memory area) in a separate software system. These data pointers also called data specifications, can take a number of forms and can be used to point to data used for a number of purposes. For example, input data pointer and output data pointer may be specified. The pointer can point to or use a particular data source system for the data, a data type, and a data item pointer. The Neural network also has a data retrieval function and a data storage function. Examples of these functions are callable routines, disk access, and network access. These are merely examples of the aspects of retrieval and storage functions. The preferred method is to have the neural network utilize data from some sensory process. The neural network itself can retrieve data from a database or another module could feed data to the areas specified by the neural networks pointers.

The neural network also needs to be trained, as discussed above. As stated previously, any presently available or future developed training method is contemplated by the present invention. The training method also may be somewhat dictated by the architecture of the neural network model that is used. Examples of aspects of training methods include back propagation, generalized delta, and gradient descent, all of which are well known in the art.

The neural network needs to know the data type that is being specified. This is particularly important since it can utilize more than one type of data. Finally, the data item pointer is specified. It is thus seen that neural network can be constructed so as to obtain desired input data or to provide output data in any intended fashion. In the preferred embodiment of the present invention, this is all done through menu selection by the user (developer) using a software based system on a computer platform. The present invention can utilize a template and menu driven user interface, which allows the user to configure, reconfigure and operate the present invention. This approach makes the present invention very user friendly. It also eliminates the need for the user to perform any computer programming, since the configuration, reconfiguration and operation of the present invention is carried out in a template and menu format not requiring any actual computer programming expertise or knowledge. There are several aids for the development of neural networks commonly available. For example, the Enterprise Miner from SAS Institute, Inc. and Intelligent Miner (IM) from IBM, provide access to a number of neural paradigms (including back propagation) using a graphical user interface (GUI) as well as an application programmer's interface (API) which allows the network to be embedded in a larger system. The Neural Network Utility (NNU) GUI runs on Intel-based machines using OS/2 or DOS/windows and on RISC/6000 machines using AIX. The API is available not only on those platforms but also on a number of mainframe platforms, including VM/CMS and OS/400. Other platforms such as variations of Windows are contemplated. Available hardware for improving neural network training and run-time performance includes the IBM Wizard, a card that plugs into MicroChannel buses. Other vendors with similar software and/or hardware products include NeuralWare, Nestor and Hecht-Nielsen Co.

ALTERNATIVES AND CLOSING

While the present invention has been described in the context of using seismic data to delineate hydrocarbon accumulations from seismic data, the present invention is not limited to this particular application. The present invention may be utilized in any number of fields including but not limited to: weather forecasting from radiometers, analysis of aeromagnetic profiles, delineation of astronomical clusters from radio-telescope data, delineation of objects from radar, sonar, and infrared returns, etc.

While the present invention has been described in detail herein in accord with certain preferred embodiments thereof, modifications and changes therein may be effected by those skilled in the art. Accordingly, it is intended by the appended claims to cover all such modifications and changes as fall within the true spirit and scope of the invention.

What is claimed is:

1. A method for the automated prediction of locations of hydrocarbon producing areas and non-producing areas directly from seismic data gathered in an area comprising the steps of:

developing a neural network using seismic training data relating to one or more hydrocarbon producing areas and seismic training data relating to one or more hydrocarbon non-producing areas; and applying the neural network to at least a portion of the seismic data to generate predictions of locations of hydrocarbon producing areas and hydrocarbon non-producing areas of the area.

2. The method of claim 1, further comprising the steps of:

developing the neural network to distinguish sub-regions within hydrocarbon producing areas; and applying the neural network to at least a portion of the seismic data to distinguish sub-regions within the hydrocarbon producing areas.

3. The method of claim 2, wherein one of the sub-regions distinguished is a gas cap.

4. The method of claim 1, wherein the automated prediction of locations is performed in real-time as the seismic data is gathered.

5. The method of claim 4, wherein the seismic data is gathered using Vibroseis.

6. A method of delineating hydrocarbon accumulations from seismic data gathered in an area comprising the steps of:

developing a neural network within a conceptual sliding window to distinguish hydrocarbon producing areas and hydrocarbon non-producing areas, wherein the neural network is developed without using historical data; and applying the neural network to at least a portion of the seismic data to distinguish hydrocarbon producing areas and hydrocarbon non-producing areas.

7. The method of claim 6, wherein the conceptual sliding window is provided with an "In" portion and an "Out" portion.

8. The method of claim 7, wherein the step of developing a neural network further comprises the steps of:

associating a first portion of the seismic data with the "Out" portion of the sliding window, wherein the first portion of the seismic data is assumed to be from a hydrocarbon non-producing area;

associating a second portion of the seismic data with the "In" portion of the sliding window, wherein the second portion of the seismic data is assumed to be from a hydrocarbon producing area;

using the associated data as inputs to the neural network;

training and testing the neural network using the first and second portions of the seismic data; and determining whether the assumptions about the first and second portions of the seismic data were accurate, and if not, repeating the above steps using different portions of the seismic data.

9. The method of claim 8, wherein the step of determining whether the assumptions about the first and second portions of the seismic data were accurate further comprises the step of calculating a variance.

10. The method of claim 6, wherein the hydrocarbon producing areas and hydrocarbon non-producing areas are distinguished in real-time as the seismic data is gathered.

11. The method of claim 10, wherein the seismic data is gathered using Vibroseis.

12. A method of predicting locations of mineral producing areas and non-producing areas from data relating to a given area comprising the steps of:

developing a neural network to distinguish mineral producing areas and mineral non-producing areas; and applying the neural network to at least a portion of the data to generate predictions of locations of mineral producing areas and non-producing areas in the given area.

13. The method of claim 12, wherein the data is aeromagnetic data.

14. The method of claim 12, wherein the data is seismic data.

15. A method of producing hydrocarbon products from an oil and/or gas field comprising the steps of:

gathering seismic data in the Oil and/or gas field;

developing a neural network using seismic training data relating to one or more hydrocarbon producing areas and seismic training data relating to one or more hydrocarbon non-producing areas;

applying the neural network to at least a portion of the seismic data to generate predictions of locations of hydrocarbon producing areas and hydrocarbon non-producing areas of the oil and/or gas field; and extracting hydrocarbons from the oil and/or gas field in one or more predicted locations.

16. An automated method of predicting locations of hydrocarbon producing areas and non-producing areas in a field directly from seismic data acquired in the field comprising the steps of:

providing a neural network;

training the neural network to recognize hydrocarbon producing areas and non-producing areas using a first and second training sets of seismic data, wherein the first training set of seismic data corresponds to a hydrocarbon producing area and the second training set of seismic data corresponds to a hydrocarbon non-producing area;

applying the neural network to at least a portion of the seismic data to identify locations of hydrocarbon producing areas and non-producing areas in the field.

17. The method of claim 16, wherein data in the first and second training sets is comprised of historical data.

18. The method of claim 16, wherein the first training set of seismic data is comprised of seismic data taken from an area known to be a hydrocarbon producing area.

19. The method of claim 18, wherein the second training set of seismic data is comprised of seismic data taken from an area known to be a hydrocarbon non-producing area.

20. The method of claim 16, wherein data in the first training set is comprised of seismic data taken from an area assumed to be in a hydrocarbon producing area.

21. The method of claim 20, wherein data in the second training set is comprised of seismic data taken from an area assumed to be in a hydrocarbon non-producing area.

22. The method of claim 16, wherein the neural network is trained using the steps of:

providing a conceptual sliding window having a first portion and a second portion;

associating the first portion of the conceptual sliding window with a first area in the field;

selecting the first training set from seismic data in the first area;

assigning a first classification to the data in the first training set, wherein the first classification represents a hydrocarbon producing area;

associating the second portion of the conceptual sliding window with a second area in the field;

selecting the second training set from seismic data in the second area;

assigning a second classification to the data in the second training set, wherein the second classification represents a hydrocarbon non-producing area; and training the neural network using the first and second training sets without using historical data.

23. The method of claim 22, further comprising the step of determining whether the neural network is adequately trained prior to applying the neural network to the seismic data.

24. The method of claim 23, wherein the determination of whether the neural network is adequately trained is accomplished by monitoring one or more variances as the neural network converges.

25. The method of claim 23, wherein if it is determined that the neural network is not adequately trained, the step of training the neural network further comprises the steps of:

associating the first portion of the conceptual sliding window with a third area in the field;

selecting the first training set from seismic data in the third area;

assigning the first classification to the data in the first training set;

associating the second portion of the conceptual sliding window with a fourth area in the field;

selecting the second training set from seismic data in the fourth area;

assigning the second classification to the data in the second training set; and training the neural network using the first and second training sets.

26. The method of claim 25, further comprising the steps of determining whether the neural network is adequately trained prior to applying the neural network to the seismic data and repeating the training steps while associating the first and second portions of the conceptual sliding window with different areas.

27. The method of claim 16, further comprising the steps of:

providing a second neural network;

training the second neural network using training data selected from output data of the initial neural network;

applying the second neural network to at least a portion of the seismic data; and determining the accuracy of the initial network by comparing the results of the initial neural network and the second neural network.

28. A method for predicting production levels of a hydrocarbon reservoir in a hydrocarbon field comprising the steps of:

gathering seismic data in the field;

gathering wellbore production data from the at least one wellbore;

developing a neural network using at least a portion of the seismic data and at least a portion of the wellbore production data as training sets; and generating predictions of hydrocarbon production levels at contemplated well sites using the trained neural network.

29. The method of claim 28, wherein the wellbore production data includes data gathered from a plurality of wellbores.

30. The method of claim 28, further comprising the step of gathering bottom hole pressure data from at least one wellbore in the reservoir.

31. The method of claim 28, wherein the step of generating predictions further comprises the step of applying the trained neural network to at least a portion of the seismic data and to at least a portion of the wellbore production data.

* * * * *